United States Patent
Reznichenko et al.

(10) Patent No.: US 12,312,368 B2
(45) Date of Patent: *May 27, 2025

(54) PREPARATION OF CATALYST SYSTEM

(71) Applicant: BOREALIS AG, Vienna (AT)

(72) Inventors: Alexander Reznichenko, Porvoo (FI); Ville Virkkunen, Porvoo (FI); Luigi Resconi, Linz (AT)

(73) Assignee: BOREALIS AG, Vienna (AT)

(*) Notice: Subject to any disclaimer, the term of this patent is extended or adjusted under 35 U.S.C. 154(b) by 696 days.

This patent is subject to a terminal disclaimer.

(21) Appl. No.: 17/614,747

(22) PCT Filed: May 20, 2020

(86) PCT No.: PCT/EP2020/064197
§ 371 (c)(1),
(2) Date: Nov. 29, 2021

(87) PCT Pub. No.: WO2020/239603
PCT Pub. Date: Dec. 3, 2020

(65) Prior Publication Data
US 2022/0227800 A1 Jul. 21, 2022

(30) Foreign Application Priority Data
May 29, 2019 (EP) .................. 19177307
May 29, 2019 (EP) .................. 19177308

(51) Int. Cl.
| | |
|---|---|
| C07F 17/00 | (2006.01) |
| C08F 4/649 | (2006.01) |
| C08F 4/659 | (2006.01) |
| C08F 4/6592 | (2006.01) |
| C08F 10/06 | (2006.01) |
| C08F 110/06 | (2006.01) |

(52) U.S. Cl.
CPC ............ *C07F 17/00* (2013.01); *C08F 4/6492* (2013.01); *C08F 4/65908* (2013.01); *C08F 4/65912* (2013.01); *C08F 4/65916* (2013.01); *C08F 4/65927* (2013.01); *C08F 10/06* (2013.01); *C08F 110/06* (2013.01); *C08F 2420/00* (2013.01); *C08F 2420/08* (2021.01); *C08F 2500/12* (2013.01); *C08F 2500/17* (2013.01); *C08F 2500/34* (2021.01); *C08F 2500/35* (2021.01); *C08F 2800/10* (2013.01)

(58) Field of Classification Search
CPC .. C07F 17/00; C08F 4/65908; C08F 4/65912; C08F 4/65916
See application file for complete search history.

(56) References Cited

U.S. PATENT DOCUMENTS

| | | |
|---|---|---|
| 7,429,635 B2 | 9/2008 | Wang et al. |
| 2001/0044505 A1 | 11/2001 | Ford et al. |
| 2003/0203809 A1 | 10/2003 | Kao et al. |
| 2004/0254310 A1 | 12/2004 | Winslow et al. |
| 2006/0116490 A1 | 6/2006 | Paczkowski et al. |
| 2008/0081887 A1 | 4/2008 | Wang et al. |
| 2018/0155459 A1 | 6/2018 | Li et al. |

FOREIGN PATENT DOCUMENTS

| | | |
|---|---|---|
| EP | 0768320 | 4/1997 |
| EP | 1828266 | 7/2015 |
| EP | 2545083 B1 | 6/2016 |
| EP | 2545084 | 8/2017 |
| EP | 3456776 | 3/2019 |
| KR | 20170073463 | 6/2017 |
| WO | 94/14856 | 7/1994 |
| WO | 95/12622 | 5/1995 |
| WO | 2002/002576 | 1/2002 |
| WO | 2002/040549 | 5/2002 |
| WO | 2006/097497 | 9/2006 |
| WO | 2007/116034 | 10/2007 |
| WO | 2011/076780 | 6/2011 |
| WO | 2011/135004 | 11/2011 |
| WO | 2012/001052 | 1/2012 |
| WO | 2012/084961 | 6/2012 |
| WO | 2013/007650 | 1/2013 |
| WO | 2014/096171 | 12/2013 |
| WO | 2014/060540 | 4/2014 |
| WO | 2015/158790 | 10/2015 |
| WO | 2015/161150 | 10/2015 |
| WO | WO-2018091684 A1 * | 5/2018 |
| WO | 2018/122134 | 7/2018 |
| WO | 2019/007655 | 1/2019 |
| WO | 2019/179959 | 9/2019 |
| WO | 2019/215122 | 11/2019 |

OTHER PUBLICATIONS

Cheng, H. N. "Carbon-13 NMR analysis of ethylene-propylene rubbers." Macromolecules 17.10 (1984): 1950-1955.
Del Hierro P et al. Soluble Fraction Analysis in polypropylene, The Column, 2014, 10(2), p. 18-23.
Resconi, Luigi, et al. "Selectivity in propene polymerization with metallocene catalysts." Chemical Reviews 100.4 (2000): 1253-1346.
Wang, Wen-Jun, and Shiping Zhu. "Structural analysis of ethylene/propylene copolymers synthesized with a constrained geometry catalyst." Macromolecules 33.4 (2000): 1157-1162.
Busico, Vincenzo, et al. "Alk-1-ene Polymerization in the Presence of a Monocyclopentadienyl Zirconium (iv) Acetamidinate Catalyst: Microstructural and Mechanistic Insights." Macromolecular rapid communications 28.10 (2007): 1128-1134.

(Continued)

*Primary Examiner* — Catherine S Branch

(74) *Attorney, Agent, or Firm* — Meunier Carlin & Curfman LLC

(57) ABSTRACT

Improved preparation process for silica supported catalyst systems, which comprise a specific class of metallocene complexes in combination with a boron containing cocatalyst and an aluminoxane cocatalyst and use of the new, improved catalyst system.

21 Claims, No Drawings

(56) References Cited

OTHER PUBLICATIONS

International Search Report and Written opinion mailed Aug. 25, 2020 in PCT/EP2020/064183 (15 pages).
International Search Report and Written opinion mailed Aug. 24, 2020 in PCT/EP2020/064194 (14 pages).
International Search Report and Written opinion mailed Sep. 3, 2020 in PCT/EP2020/064197 (12 pages).

\* cited by examiner

PREPARATION OF CATALYST SYSTEM

CROSS REFERENCE TO RELATED APPLICATIONS

This application is a United States National Phase Patent Application filed under 35 U.S.C. § 371 of PCT/EP2020/064197, filed May 20, 2020, which claims priority to European Patent Application No. 19177307.6, filed May 29, 2019, and European Patent Application No. 19177308.4, filed May 29, 2019, all of which are incorporated herein by reference in their entireties.

The present invention relates to an improved preparation process for silica supported catalyst systems, which comprise a specific class of metallocene complexes in combination with a boron containing cocatalyst and an aluminoxane cocatalyst. The invention also relates to the use of the new, improved catalyst system.

Metallocene catalysts have been used to manufacture polyolefins for many years. Countless academic and patent publications describe the use of these catalysts in olefin polymerization. Metallocenes are now used industrially and polyethylenes and polypropylenes in particular are often produced using cyclopentadienyl based catalyst systems with different substitution patterns.

Metallocene catalysts are used in propylene polymerization in order to achieve some desired polymer properties. Suitable metallocene catalysts should have high activity and high productivity. Several attempts have been described in the patent literature.

WO 2002/040549 discloses an olefin polymerization catalyst comprising a metallocene compound, a supported activator such as MAO, an ionization activator such as dimethylanilinium tetra(pentafluorophenyl)borate and triphenylcarbeniumtetra(pentafluorophenyl)borate and a carrier.

US Patent Publication Application No. 2006/0116490 discloses a metallocene catalyst for olefin polymerization comprising a combination of a carrier and an ionic compound such as aluminoxane and tetrakis(pentafluorophenyl) borate, as a co-catalyst, and a metallocene compound. These catalysts have the disadvantage of low activity.

As an improvement, EP2545084 suggests providing a highly active supported metallocene catalyst in which a metallocene compound having a ligand substituted with alkoxide or aryloxide is incorporated into a conventional supported metallocene catalyst and a borate compound is incorporated as a second co-catalyst, to exhibit considerably superior catalyst activity.

The catalyst system comprises a carrier, a first co-catalyst (e.g. MAO) layer laminated on the carrier, a first metallocene compound layer laminated on the first co-catalyst layer; and a second co-catalyst layer laminated on the first metallocene compound layer, wherein the second co-catalyst layer is N,N-dimethylanilinium tetrakis(pentafluorophenyl)borate.

Although such catalyst systems show an improved catalyst activity compared to catalysts described in WO 2002/040549 and US 2006/0116490, and can produce polyolefins, especially polyethylene, having a high molecular weight, a narrow molecular weight distribution and prevent fouling in the preparation process, there is still room for improving the catalyst behaviour in view of even higher activity and productivity. In addition, it would be desirable to simplify the preparation process in view of EP2545084, such as to reduce the number of preparation steps.

Thus, it is desired to find catalyst systems, which provide high activity and productivity, especially in the case of copolymerization between propylene and α-olefins of 4 to 8 C atoms and/or ethylene to form propylene copolymers. The desired catalysts should also have improved performance in the production of high molecular weight polypropylene polymers, especially homopolymers. Various prior art references aim for one or more of these features.

WO 02/02576 describes, inter alia, rac-Me$_2$Si[2-Me-4-(3, 5-Me$_2$Ph)Ind]$_2$ZrCl$_2$ and its use in the manufacture of high Mw and high melting point polypropylene.

The metallocene catalysts of WO 02/02576, activated with either MAO or a borate, are carried on a silica support. At polymerization temperatures of 60° C. or 70° C. they give iPP with Tm between 156° C. and 159° C. but at very poor catalyst activity.

WO 2013/007650 describes certain asymmetrical catalysts comprising alkoxy groups at the 5-position of one of the rings such as dimethylsilylene (η5-6-tert-butyl-5-methoxy-2-methyl-4-phenyl-1H-inden-1-yl)-(η$_5$-6-tert-butyl-2-methyl-4-phenyl-1H-inden-1-yl)zirconium dichloride. The catalysts are prepared with a specific emulsion/solidification technology and activated with MAO only.

Despite its good performance, catalysts based on this reference are limited in terms of polypropylene homopolymer melting temperature, productivity at low MFR. In addition, the overall productivity of the catalyst still needs to be improved. Furthermore, it would be desirable to simplify the production of the catalyst system. According to WO 2013/007650 an extra prepolymerization step is needed before the catalyst system can be used.

WO 2018/122134 describes, inter alia the complex rac-anti-dimethylsilanediyl[2-methyl-4-(3',5'-dimethylphenyl)-1,5,6,7-tetrahydro-s-indacen-1-yl][2-methyl-4-(3',5'-dimethylphenyl)-5-methoxy-6-tert-butylinden-1-yl]zirconium dichloride, which is activated with MAO only and is supported on silica.

WO 2014/060540 describes inter alia the use of the complex dimethylsilylene(2-methyl-4-phenyl-5-methoxy-6-tert-butyl-indenyl)(2-methyl-4-(4-tert-butyl-phenyl)indenyl)zirconium dichloride in combination with MAO and borate cocatalyst. The catalysts are prepared with a special emulsion/solidification technology, which, as stated above includes an off-line prepolymerization step of the catalyst system before use. In addition, the activity of the prepolymerized catalyst system is quite low.

Although a lot of work has been done in the field of metallocene catalysts, there remain still some problems, which relate mainly to the productivity or activity of the catalysts. In addition, straightforward and cost-efficient catalyst preparation procedures are desired.

The inventors have identified an improved preparation process for silica supported catalyst systems that are composed of a specific class of metallocene complexes in combination with a boron containing cocatalyst and an aluminoxane cocatalyst, which leads to an improved polymerization behavior, higher catalyst productivity, improved performance in the production of high molecular weight propylene polymers, like e.g. propylene homopolymers and propylene random copolymers, thus being ideal for the production of high molecular weight propylene homopolymers, propylene random copolymers, especially propylene-ethylene random copolymers, and also suitably heterophasic propylene copolymers. The specific catalyst system gives a higher flexibility/freedom in the design of propylene polymers than prior art catalyst systems.

In addition, the novel preparation procedure is more robust and requires fewer steps compared to the prior art.

SUMMARY OF THE INVENTION

Viewed from one aspect the invention provides a process for the preparation of a supported catalyst system wherein the catalyst system comprises
(i) a metallocene complex;
(ii) a cocatalyst system comprising a boron containing cocatalyst and an aluminoxane cocatalyst; and
(iii) a porous inorganic support,
whereby the process comprises the steps of
a) reacting the porous inorganic support with aluminoxane cocatalyst in a hydrocarbon solvent to obtain aluminoxane cocatalyst treated support;
b) reacting the metallocene complex with aluminoxane cocatalyst in a hydrocarbon solvent, wherein the amount of aluminoxane cocatalyst added in step a) is 75.0 to 97.0 wt % of the total amount of aluminoxane cocatalyst and the amount of aluminoxane cocatalyst added in step b) is 3.0 to 25.0 wt % of the total amount of aluminoxane cocatalyst;
c) adding the boron containing cocatalyst to the solution obtained in step b) to obtain a solution of metallocene complex, boron containing cocatalyst and aluminoxane cocatalyst whereby the boron containing cocatalyst is added in an amount that a boron/M molar ratio of feed amounts in the range of 0.1:1 to 10:1 is reached;
d) adding the solution obtained in step c) to the aluminoxane cocatalyst treated support obtained in step a) and optionally
e) drying the so obtained supported catalyst system.

In one embodiment, the metallocene complex is an optionally bridged biscyclopentadienyl type metallocene complex or a constrained geometry metallocene complex. Preferred metallocene complexes are those of formula (I)-(III):

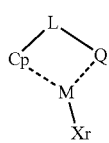

(I)

(Cp)₂MXr (II)

or

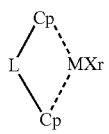

(III)

wherein each X independently is a sigma-donor ligand;
M is Ti, Zr, Hf, Y, Sc, La, or an element from the lanthanides, preferably Ti, Zr or Hf;
each Cp independently is an unsubstituted or substituted cyclopentadienyl containing ligand or unsubstituted or substituted fused cyclopentadienyl containing ligand;
Q is —O or —NW or —PW;
W is an organic group or H;
L is a carbon, silicon or germanium based bridge in which one to four backbone atoms link the ligands; and
r is an integer such that the oxidation state of the metal is satisfied.

Any Cp ligand is preferably a substituted or unsubstituted cyclopentadienyl, substituted or unsubstituted indenyl, substituted or unsubstituted indacenyl ligand or substituted or unsubstituted fluorenyl ligand.

L is preferably a carbon, silicon or germanium based divalent bridge in which one or two backbone atoms link the ligands.

Viewed from another aspect the invention provides a process for the preparation of a supported catalyst system wherein the catalyst system comprises
(i) a metallocene complex of formula (IV):

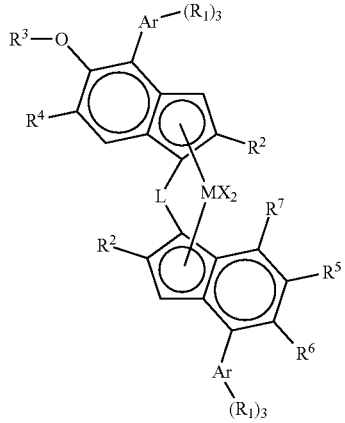

(IV)

wherein
each X independently is a sigma-donor ligand,
M is Zr or Hf;
L is a carbon, silicon or germanium based divalent bridge in which one or two backbone atoms link the ligands;
each Ar is an aryl or heteroaryl group having 3 to 20 carbon atoms, such as a phenyl ring or a 5 or 6 membered heteroaryl ring;
each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the carbons to which they are bonded,
each $R^2$ independently are the same or can be different and are a CHR⁸—R⁸ group, with $R^8$ being H or linear or branched $C_{1-6}$-alkyl group, $C_{3-8}$-cycloalkyl group, $C_{6-10}$-aryl group, or a heteroaryl group having 3 to 20 carbon atoms optionally substituted by one to three groups $R^{11}$, and $R^{8'}$ is H or a $C_{1-6}$ alkyl;
$R^3$ is a linear or branched $C_1$-$C_6$-alkyl group, $C_{7-20}$-arylalkyl, $C_{7-20}$-alkylaryl group or $C_6$-$C_{20}$-aryl group;
$R^4$ is a C(R⁹)₃ group, with $R^9$ being a linear or branched $C_1$-$C_6$-alkyl group;
$R^5$ is hydrogen or an aliphatic $C_1$-$C_{20}$-hydrocarbyl group optionally containing one or more heteroatoms from groups 14-16 of the periodic table of elements;
$R^6$ is hydrogen or an aliphatic $C_1$-$C_{20}$-hydrocarbyl group optionally containing one or more heteroatoms from groups 14-16 of the periodic table of elements; or
$R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;

$R^7$ is H or a linear or branched $C_1$-$C_6$-alkyl group or an aryl or heteroaryl group having 3 to 20 carbon atoms optionally substituted by one to three groups $R^{11}$ such as a phenyl ring or a 5 or 6 membered heteroaryl ring; and each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group;

(ii) a cocatalyst system comprising a boron containing cocatalyst and an aluminoxane cocatalyst; and (iii) a porous inorganic support, whereby the process comprises the steps of a) reacting the porous inorganic support with aluminoxane cocatalyst in a hydrocarbon solvent to obtain aluminoxane cocatalyst treated support;

b) reacting the metallocene complex of formula (IV) with aluminoxane cocatalyst in a hydrocarbon solvent, wherein the amount of aluminoxane cocatalyst added in step a) is 75.0 to 97.0 wt % of the total amount of aluminoxane cocatalyst and the amount of aluminoxane cocatalyst added in step b) is 3.0 to 25.0 wt % of the total amount of aluminoxane cocatalyst;

c) adding the boron containing cocatalyst to the solution obtained in step b) to obtain a solution of the metallocene complex of formula (IV), boron containing cocatalyst and aluminoxane cocatalyst whereby the boron containing cocatalyst is added in an amount that a boron/M molar ratio of feed amounts in the range of 0.1:1 to 10:1 is reached;

d) adding the solution obtained in step c) to the aluminoxane cocatalyst treated support obtained in step a); and optionally e) drying the so obtained supported catalyst system.

Viewed from one aspect the invention provides a process for the preparation of a supported catalyst system, the catalyst system comprises a metallocene complex of formula (V):

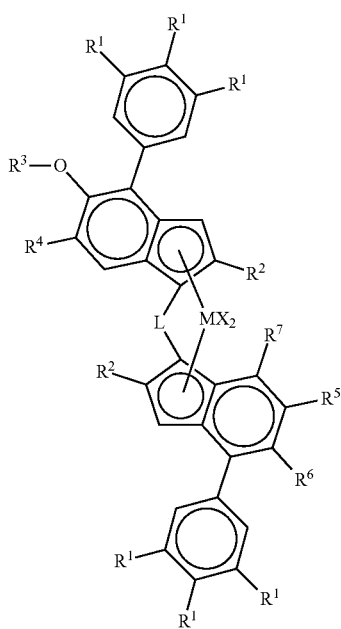

Formula (V)

wherein

M is Zr or Hf, each X independently is a sigma-donor ligand,

L is a divalent bridge selected from —R'$_2$C—, —R'$_2$C—CR'$_2$—, —R'$_2$Si—, —R'$_2$Si—SiR'$_2$—, —R'$_2$Ge— wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a CH$_2$—$R^8$ group, with $R^8$ being H or linear or branched $C_{1-6}$-alkyl group, $C_{3-8}$-cycloalkyl group, $C_{6-10}$-aryl group, $R^3$ is a linear or branched $C_1$-$C_6$-alkyl group, $C_{7-20}$-arylalkyl, $C_{7-20}$-alkylaryl group or $C_6$-$C_{20}$-aryl group, $R^4$ is a C($R^9$)$_3$ group, with $R^9$ being a linear or branched $C_1$-$C_6$-alkyl group, $R^5$ is hydrogen or an aliphatic $C_1$-$C_{20}$-hydrocarbyl group optionally containing one or more heteroatoms from groups 14-16 of the periodic table of elements;

$R^6$ is hydrogen or an aliphatic $C_1$-$C_{20}$-hydrocarbyl group optionally containing one or more heteroatoms from groups 14-16 of the periodic table of elements; or $R^5$ and $R^6$ can be joined as parts of a 5-membered ring condensed with the indenyl ring, which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a cocatalyst system comprising a boron containing cocatalyst and an aluminoxane cocatalyst; and (iii) a silica support, whereby the process comprises the steps of a) reacting the silica support with aluminoxane cocatalyst in a hydrocarbon solvent to obtain aluminoxane cocatalyst treated support;

b) reacting the metallocene complex of formula (V) with aluminoxane cocatalyst in a hydrocarbon solvent, wherein the amount of aluminoxane cocatalyst added in step a) is 75.0 to 97.0 wt % of the total amount of aluminoxane cocatalyst and the amount of aluminoxane cocatalyst added in step b) is 3.0 to 25.0 wt % of the total amount of aluminoxane cocatalyst;

c) adding the boron containing cocatalyst to the solution obtained in step b) to obtain a solution of metallocene complex of formula (V), boron containing cocatalyst and aluminoxane cocatalyst, whereby the boron containing cocatalyst is added in an amount that a boron/M molar ratio of feed amounts in the range of 0.1:1 to 10:1 is reached;

d) adding the solution obtained in step c) to the aluminoxane cocatalyst treated support obtained in step a); and e) drying the so obtained supported catalyst system.

By preparing the catalyst system according to the present invention, a very high activity and productivity of the catalyst system can be obtained.

Thus, according to a further embodiment, the present invention relates to a process for producing olefin polymers using the specific catalyst system of the invention, wherein olefins comprise olefins of 2 to 12 C atoms, preferably of 2 to 8 C atoms or mixtures thereof, typically ethylene or propylene olefins with comonomers selected monomer of 2 to 6 C atoms. Especially the present invention relates to a process for producing a propylene polymer, like a propylene homopolymer, a propylene random copolymer or a heterophasic propylene copolymer using the specific catalyst system, as defined before.

Definitions

Throughout the description, the following definitions are employed.

The term "$C_{1-20}$-hydrocarbyl group" includes $C_{1-20}$-alkyl, $C_{2-20}$-alkenyl, $C_{2-20}$-alkynyl, $C_{3-20}$-cycloalkyl, $C_{3-20}$-cycloalkenyl, $C_{6-20}$-aryl groups, $C_{7-20}$-alkylaryl groups or $C_{7-20}$-arylalkyl groups or mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$-hydrocarbyl groups are $C_{1-20}$-alkyl, $C_{4-20}$-cycloalkyl, $C_{5-20}$-cycloalkylalkyl groups, $C_{7-20}$-alkylaryl groups, $C_{7-20}$-arylalkyl groups or $C_{6-20}$-aryl groups, especially $C_{1-10}$-alkyl groups, $C_{6-10}$-aryl groups, or $C_{7-12}$-arylalkyl groups, e.g. $C_{1-8}$-alkyl groups. Most especially preferred hydrocarbyl groups are methyl, ethyl, propyl, isopropyl, tert-butyl, isobutyl, $C_{5-6}$-cycloalkyl, cyclohexylmethyl, phenyl or benzyl.

The term "halo" includes fluoro, chloro, bromo and iodo groups, especially chloro or fluoro groups, when relating to the complex definition.

Any group including "one or more heteroatoms belonging to groups 14-16 of the periodic table of elements" preferably means O, S or N. N groups may present as —NH— or —NR"— where R" is $C_1$-$C_{10}$-alkyl. There may, for example, be 1 to 4 heteroatoms. The group including one or more heteroatoms belonging to groups 14-16 of the periodic table of elements may also be an alkoxy group, e.g. a $C_1$-$C_{10}$-alkoxy group, so the heteroatom may be positioned at the end of the group and bind to the adjacent atom.

The oxidation state of the metal ion is governed primarily by the nature of the metal ion in question and the stability of the individual oxidation states of each metal ion. It will be appreciated that in the complexes of the invention, the metal ion M is coordinated by ligands X so as to satisfy the valency of the metal ion and to fill its available coordination sites. The nature of these σ-ligands can vary greatly.

The term "C4 phenyl ring" relate to the substituted phenyl rings attached to the 4 positions of the indenyl or indacenyl rings, respectively. The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst.

The term "molecular weight" is used herein to refer to weight average molecular weight Mw unless otherwise stated.

DETAILED DESCRIPTION OF THE INVENTION

This invention relates to an improved preparation process of a supported catalyst system, which comprises a metallocene complex in combination with a boron containing cocatalyst and an aluminoxane cocatalyst and hence for catalyst systems that are ideal for the polymerization of propylene.

The metallocene catalyst complexes of the invention can be either symmetrical or asymmetrical. Asymmetrical means simply that the two ligands forming the metallocene are different, that is, each ligand bears a set of substituents that are chemically different.

The metallocene catalyst complexes of the invention may be chiral, racemic bridged bisindenyl metallocenes in their anti-configuration. The metallocenes of the invention are either C2-symmetric or C1-symmetric. When they are C1-symmetric they still maintain a pseudo-C2-symmetry since they maintain C2-symmetry in close proximity of the metal center, although not at the ligand periphery. By nature of their chemistry, both a meso form and a racemic enantiomer pair (in case of C2-symmetric complexes) or anti and syn enantiomer pairs (in case of C1-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the FIGURE below.

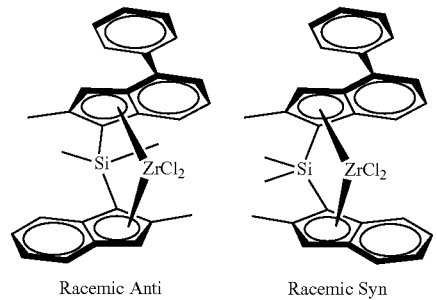

Racemic Anti        Racemic Syn

Formulae herein, are intended to cover both syn- and anti-configurations. Preferred metallocene catalyst complexes are in the anti configuration.

The metallocene catalyst complexes of the invention may be employed as the racemic-anti isomers. Ideally, therefore at least 95% mol, such as at least 98% mol, especially at least 99% mol of the metallocene catalyst complex is in the racemic-anti isomeric form.

In the metallocene catalyst complexes of the invention, the following preferences apply.

The metallocene complex can be any biscyclopentadienyl type complex, especially a bridged biscyclopentadienyl type complex or it may be a constrained geometry metallocene catalyst.

In any formula of the invention, the following preferred features apply.

M can be any group 3 or 4 metal or a metal from the lanthanide series. M is preferably Zr or Hf, preferably Zr.

Each X independently is a sigma-donor ligand. Thus each X may be the same or different, and is preferably a hydrogen atom, a halogen atom, a linear or branched, cyclic or acyclic $C_{1-20}$-alkyl or -alkoxy group, a $C_{6-20}$-aryl group, a $C_{7-20}$-alkylaryl group or a $C_{7-20}$-arylalkyl group; optionally containing one or more heteroatoms of Group 14-16 of the periodic table.

In one embodiment the X group may be trihydrocarbylsilyl, $C_{1-10}$-alkoxy, $C_{1-10}$-alkoxy-$C_{1-10}$-alkyl-, or amido group.

The term halogen includes fluoro, chloro, bromo and iodo groups, preferably chloro groups. The term heteroatoms belonging to groups 14-16 of the periodic table includes for example Si, N, O or S.

More preferably, each X is independently a hydrogen atom, a halogen atom, a linear or branched $C_{1-6}$-alkyl or $C_{1-6}$-alkoxy group, a phenyl or benzyl group.

Yet more preferably, each X is independently a halogen atom, a linear or branched $C_{1-4}$-alkyl or $C_{1-4}$-alkoxy group, a phenyl or benzyl group.

Most preferably, each X is independently chlorine, benzyl or a methyl group.

Preferably, both X groups are the same.

The most preferred options for both X groups are two chlorides, two methyl or two benzyl groups.

W is preferably a $C_{1-20}$ hydrocarbyl group especially a $C_{1-10}$ alkyl group.

L is a bridge based on carbon, silicon or germanium. There are one to four such as one or two backbone linking atoms between the two ligands, e.g. a structure such as ligand-C-ligand (one backbone atom) or ligand-Si—Si-ligand (two backbone atoms).

The bridging atoms can carry other groups. For example, suitable bridging ligands L are selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring. In one embodiment R' can be an alkyl having 1 to 10 carbon atoms substituted with alkoxy having 1 to 10 carbon atoms.

The term heteroatoms belonging to groups 14-16 of the periodic table includes for example Si, N, O or S.

Preferably L is —R'$_2$Si—, ethylene or methylene.

In the formula —R'$_2$Si—, each R' is preferably independently a $C_1$-$C_{20}$-hydrocarbyl group. The term $C_{1-20}$-hydrocarbyl group therefore includes $C_{1-20}$-alkyl, $C_{2-20}$-alkenyl, $C_{2-20}$-alkynyl, $C_{3-20}$-cycloalkyl, $C_{3-20}$-cycloalkenyl, $C_{6-20}$-aryl groups, $C_{7-20}$-alkylaryl groups or $C_{7-20}$-arylalkyl groups or of course mixtures of these groups such as cycloalkyl substituted by alkyl. Unless otherwise stated, preferred $C_{1-20}$-hydrocarbyl groups are $C_{1-20}$-alkyl, $C_{4-20}$-cycloalkyl, $C_{5-20}$-cycloalkyl-alkyl groups, $C_{7-20}$-alkylaryl groups, $C_{7-20}$-arylalkyl groups or $C_{6-20}$-aryl groups.

In one embodiment the formula —R'$_2$Si—, represents silacycloalkanediyls, such as silacyclobutane, silacyclopentane, or 9-silafluorene.

Preferably, both R' groups are the same. It is preferred if R' is a $C_1$-$C_{10}$-hydrocarbyl or $C_6$-$C_{10}$-aryl group, such as methyl, ethyl, propyl, isopropyl, tertbutyl, isobutyl, $C_{3-8}$-cycloalkyl, cyclohexylmethyl, phenyl or benzyl, more preferably both R' are a $C_1$-$C_6$-alkyl, $C_{5-6}$-cycloalkyl or $C_6$-aryl group, and most preferably both R' are methyl or one is methyl and the other is cyclohexyl. Most preferably the bridge is —Si(CH$_3$)$_2$—.

Ar is an aryl or heteroaryl group having 3 to 20 carbon atoms, such as a phenyl ring or a 5 or 6 membered heteroaryl ring. Ar is preferably a phenyl group or 5 or 6 membered heteroaryl ring such as furanyl, thiophenyl, or pyridyl ring. It is preferred however, if the Ar groups are phenyl groups.

It is preferred that when the Ar group is a phenyl group then the $R_1$ substituents are in the 3,4,5-position of the ring (where the 1-position is attached to the indenyl ring).

Each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded.

Preferably, each $R^1$ are independently the same or can be different and are hydrogen, or a linear or branched $C_{1-6}$-alkyl group, like methyl or tert.-butyl.

It is for example possible that the Ar ring e.g. C4-phenyl ring is unsubstituted (i.e. $R^1$ are hydrogen), or substituted in the para position only, like 4'-tert.-butyl phenyl, or di-substituted in the 3' and 5' position, like 3',5'-dimethylphenyl or 3',5'-ditert.-butylphenyl. Furthermore, it is possible that both phenyl rings have the same substitution pattern or that the two phenyl rings have different substitution patterns.

It is therefore preferred if one or two $R^1$ groups is H. If two $R^1$ groups are H then the remaining R1 group is preferably in the para position. If one $R^1$ group is H then the remaining $R^1$ groups are preferably in the meta positions.

Each $R^2$ independently are the same or can be different and are a CHR$^{8'}$—R$^8$ group, with R$^8$ being H or linear or branched $C_{1-6}$-alkyl group, $C_{3-8}$-cycloalkyl group, $C_{6-10}$-aryl group, heteroaryl group having 3 to 20 carbon atoms optionally substituted by one to three groups R$^{11}$, and R$^{8'}$ is H or a $C_{1-6}$ alkyl.

Preferably R$^{8'}$ is H or methyl, especially H.

Preferably each $R^2$ independently are the same or can be different and are a CH$_2$—R$^8$ group, with R$^8$ being H or linear or branched $C_{1-6}$-alkyl group, $C_{3-8}$-cycloalkyl group, $C_{6-10}$-aryl group.

Preferably, both $R^2$ are the same and are a CH$_2$—R$^8$ group, with R$^8$ being H or linear or branched $C_1$-$C_4$-alkyl group, more preferably, both $R^2$ are the same and are a CH$_2$—R$^8$ group, with R$^8$ being H or linear or branched $C_1$-$C_3$-alkyl group. Most preferably, both $R^2$ are methyl.

$R^3$ is a linear or branched $C_1$-$C_6$-alkyl group, $C_{7-20}$-arylalkyl, $C_{7-20}$-alkylaryl group or $C_6$-$C_{20}$-aryl group.

$R^3$ is a preferably linear or branched $C_1$-$C_6$-alkyl group or $C_{6-20}$-aryl group, such as methyl, ethyl, n-propyl, i-propyl, n-butyl, i-butyl, sec.-butyl and tert.-butyl, preferably a linear $C_1$-$C_4$-alkyl group, more preferably a $C_1$-$C_2$-alkyl group and most preferably methyl.

$R^4$ is preferably a C(R$^9$)$_3$ group, with R$^9$ being a linear or branched $C_1$-$C_6$-alkyl group. Preferably each R$^9$ are the same or different with R$^9$ being a linear or branched $C_1$-$C_4$-alkyl group, more preferably with R$^9$ being the same and being a $C_1$-$C_2$-alkyl group. Most preferably, $R^4$ is a tert.-butyl group and hence all R$^9$ groups are methyl.

In one embodiment of the present invention R$^5$ and R$^6$ independently are the same or can be different and are hydrogen or an aliphatic $C_1$-$C_{20}$-hydrocarbyl group optionally containing one or more heteroatoms from groups 14-16 of the periodic table of elements, like an alkyl or alkoxy group, e.g. a $C_1$-$C_{10}$-alkyl or -alkoxy group.

Preferably, $R^5$ and $R^6$ independently are the same or can be different and are hydrogen or a linear or branched $C_1$-$C_6$ alkyl group, or a $C_1$-$C_6$-alkoxygroup.

More preferably, $R^5$ and $R^6$ independently are the same or can be different and are hydrogen or a linear or branched $C_1$-$C_4$-alkyl group or a $C_1$-$C_4$-alkoxygroup.

In another embodiment $R^5$ and $R^6$ can be joined as parts of the 5-membered ring condensed with indenyl ring which is optionally substituted by n groups $R^{10}$, n being from 0 to 4, preferably 0 or 2 and more preferably 0; whereby each $R^{10}$ can be the same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements; preferably a linear or branched $C_1$-$C_6$-alkyl group.

$R^7$ is H or a linear or branched $C_1$-$C_6$-alkyl group or an aryl or heteroaryl group having 6 to 20 carbon atoms optionally substituted by 1 to 3 groups $R^{11}$.

Preferably, $R^7$ is H or an aryl group having 6 to 10 carbon atoms optionally substituted by 1 to 3 groups $R^{11}$, more preferably $R^7$ is H or a phenyl group optionally substituted by 1 to 3 groups $R^{11}$.

In case $R^7$ is an optionally substituted aryl group having 6 to 10 carbon atoms, like phenyl, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group. It is most preferred if $R^7$ is not H.

It is most preferred if $R^7$ is a phenyl group optionally substituted by 1 to 3 groups $R^{11}$, more preferably $R^7$ is a phenyl group substituted by 1 to 2 groups $R^{11}$.

Preferably, each $R^{11}$ are independently the same or can be different and are hydrogen, a linear or branched $C_1$-$C_6$-alkyl group or $C_{6-20}$-aryl groups or an OY-group, wherein Y is a $C_{1-4}$-hydrocarbyl group. More preferably, each $R^{11}$ are independently the same or can be different and are hydrogen or a linear or branched $C_1$-$C_4$-alkyl group or an OY-group, wherein Y is a $C_{1-4}$-hydrocarbyl group. Even more preferably, each $R^{11}$ are independently the same or can be different and are hydrogen, methyl, ethyl, isopropyl, tert.-butyl or methoxy, especially hydrogen, methyl or tert.-butyl.

Even more preferably, each $R^{11}$ are independently the same or can be different and are methyl, ethyl, isopropyl, tert.-butyl or methoxy, especially, methyl or tert.-butyl.

If the aryl group, like the phenyl group is substituted, it is preferably substituted by 1 or 2 $R^{11}$ groups, such as non H $R^{11}$ groups.

It is most preferred if the 4-position group and the $R^7$ group are the same. Therefore, if $R^7$ is a 3,5-dimethylphenyl group, the group on position 4 of the ligand should be a 3,5-dimethylphenyl group. This is especially the case when the ring is an indacenyl ring.

In a preferred embodiment, the metallocene complex is one of formula of formula (I)-(III):

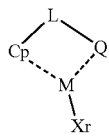

(I)

(Cp)$_2$MXr (II)

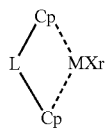

(III)

wherein each X independently is a sigma-donor ligand,
M is Ti, Zr, Hf, Y, Sc, La, or an element from the lanthanides, preferably Ti, Zr or Hf, more preferably Zr of Hf;
each Cp independently is an unsubstituted or substituted cyclopentadienyl containing ligand and/or fused unsubstituted or substituted cyclopentadienyl containing ligand;
Q is —O or —NW or —PW;
W is an organic group or H;
L is a carbon, silicon or germanium based bridge in which one to four backbone atoms link the ligands; and
r is an integer such that the oxidation state of the metal is satisfied. If M is Ti, Zr or Hf then r is 2.

The term cyclopentadienyl containing ligand means any ligand in which a cyclopentadienyl ring is present which may be cyclopentadienyl itself or it may be cyclopentadienyl fused to other rings making the likes of indenyl.

In a more preferred embodiment, the metallocene complex is one of formula (VI)

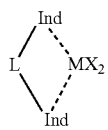

(VI)

each X independently is a sigma-donor ligand,
M is a group 4 metal such as Zr or Hf;
L is a carbon, silicon or germanium based bridge in which one to four backbone atoms link the ligands; and
each Ind is a substituted or unsubstituted indenyl, or substituted or unsubstituted fused indenyl such as a substituted or unsubstituted indacenyl ligand or substituted or unsubstituted fluorenyl ligand.

Further preferred metallocenes are of formula (VII)

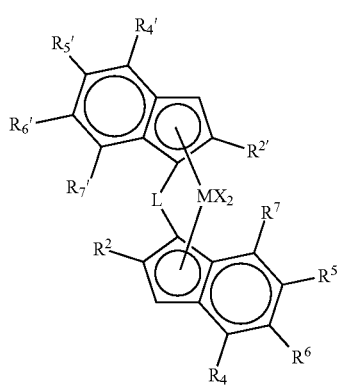

Formula (VII)

wherein each X independently is a sigma-donor ligand;
M is a group 4 metal such as Zr or Hf;
L is a carbon, silicon or germanium based divalent bridge in which one or two backbone atoms link the ligands;
$R^2$ and $R^{2'}$ are, independently from each other, H, —OSi$(C_{1-10}$-hydrocarbyl$)_3$, CHR$^{8'}$—$R^8$ group, with $R^8$ being H or linear or branched $C_{1-6}$-alkyl group, $C_{3-8}$-cycloalkyl group, $C_{6-10}$-aryl group, or an optionally substituted heteroaryl group having 3 to 20 carbon atoms, and $R^{8'}$ is H or a $C_{1-6}$ alkyl;
$R^{4-6}$ are independently hydrogen or a $C_1$-$C_{20}$-hydrocarbyl group optionally containing one or more heteroatoms from groups 14-16 of the periodic table of elements;
$R^{4'-6'}$ are independently hydrogen or a $C_1$-$C_{20}$-hydrocarbyl group optionally containing one or more heteroatoms from groups 14-16 of the periodic table of elements; or
$R^5$ and $R^6$ can be taken together to form an optionally substituted 5 or 6 membered carbon ring; and/or
$R^{5'}$ and $R^{6'}$ can be taken together to form an optionally substituted 5 or 6 membered carbon ring;
$R^7$ is hydrogen or a $C_{1-20}$ hydrocarbyl group optionally containing up to two silicon atoms or heteroatoms; and
$R^{7'}$ is hydrogen, a $C_{1-3}$ hydrocarbyl group or a $C_{1-10}$ alkoxy group.
Further preferred metallocenes are of formula (VIII)

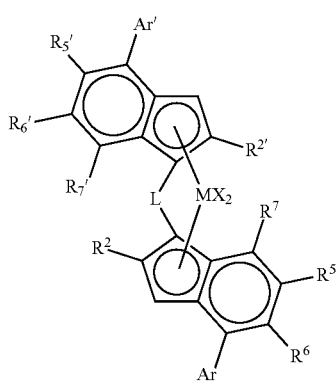

Formula (VIII)

wherein each X independently is a sigma-donor ligand;
M is a group 4 metal such as Zr or Hf;
L is a carbon, silicon or germanium based divalent bridge in which one or two backbone atoms link the ligands;
$R^2$ and $R^{2'}$ are, independently from each other, H, —OSi$(C_{1-10}$-hydrocarbyl$)_3$, CHR$^{8'}$—$R^8$ group, with $R^8$ being H or linear or branched $C_{1-6}$-alkyl group, $C_{3-8}$-cycloalkyl group, $C_{6-10}$-aryl group, or an optionally substituted heteroaryl group having 3 to 20 carbon atoms, and $R^{8'}$ is H or a $C_{1-6}$ alkyl;
$R^{5-6}$ are independently hydrogen or a $C_1$-$C_{20}$-hydrocarbyl group optionally containing one or more heteroatoms from groups 14-16 of the periodic table of elements;
$R^{5'-6'}$; are independently hydrogen or a $C_1$-$C_{20}$-hydrocarbyl group optionally containing one or more heteroatoms from groups 14-16 of the periodic table of elements; or
$R^5$ and $R^6$ can be taken together to form a 5 membered saturated carbon ring which is optionally substituted by n groups $R^{10}$, n being from 0 to 4; or
$R^{5'}$ and $R^{6'}$ can be taken together to form a 5 membered saturated carbon ring which is optionally substituted by n groups $R^{10}$, n being from 0 to 4;
each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;
$R^7$ is hydrogen or a $C_{1-20}$ hydrocarbyl group optionally containing up to two silicon atoms or heteroatoms;
$R^{7'}$ is hydrogen, a $C_{1-3}$ hydrocarbyl group or an $C_{1-10}$ alkoxy group.
Ar and Ar' are independently a $C_6$-$C_{22}$ aryl group, or a $C_3$-$C_{20}$ heteroaryl group optionally substituted by up to 5 groups $R^1$; and
$R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group.
Further preferred metallocenes are of formula (IX)

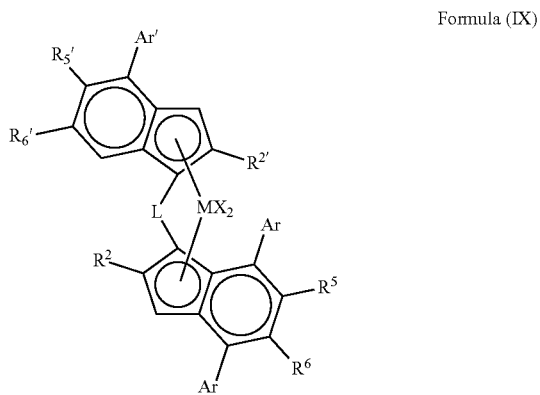

Formula (IX)

wherein each X independently is a sigma-donor ligand,
M is a group 4 metal such as Zr or Hf;
L is a carbon, silicon or germanium based divalent bridge in which one or two backbone atoms link the ligands;
$R^2$ and $R^{2'}$ are, independently from each other, H, —OSi$(C_{1-10}$-hydrocarbyl$)_3$, CHR$^{8'}$—$R^8$ group, with $R^8$ being H or linear or branched $C_{1-6}$-alkyl group, $C_{3-8}$-cycloalkyl group, $C_{6-10}$-aryl group, or an optionally substituted heteroaryl group having 3 to 20 carbon atoms; and $R^{8'}$ is H or a $C_{1-6}$ alkyl;
$R^{5-6}$ are independently hydrogen or a $C_1$-$C_{20}$-hydrocarbyl group optionally containing one or more heteroatoms from groups 14-16 of the periodic table of elements;
$R^{5'-6'}$; are independently hydrogen or a $C_1$-$C_{20}$-hydrocarbyl group optionally containing one or more heteroatoms from groups 14-16 of the periodic table of elements; or
$R^5$ and $R^6$ can be taken together to form a 5 membered saturated carbon ring which is optionally substituted by n groups $R^{10}$, n being from 0 to 4; or
$R^{5'}$ and $R^{6'}$ can be taken together to form a 5 membered saturated carbon ring which is optionally substituted by n groups $R^{10}$, n being from 0 to 4;
each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;
Ar and Ar' are phenyl, naphthyl, anthracenyl, pyridyl, thiophenyl, 2-alkylthiophenyl, benzothiophenyl, pyrrolyl, furanyl, 2-alkylfuranyl optionally substituted by up to 5 groups $R^1$; and $R^1$ are independently the same or can be different and are hydrogen, a linear or branched $C_1$-$C_6$-alkyl group, a $C_{7\text{-}20}$-arylalkyl, $C_{7\text{-}20}$-alkylaryl group or $C_{6\text{-}20}$-aryl group or an OY group, wherein Y is a $C_{1\text{-}10}$-hydrocarbyl group.

Further preferred metallocenes are of formula (X)

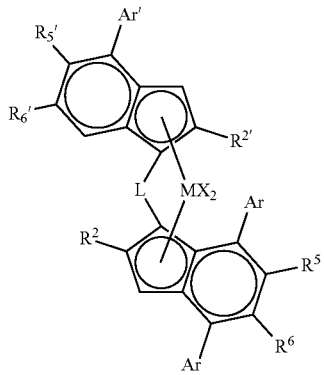

(X)

each X independently is a sigma-donor ligand;

M is a group 4 metal such as Zr or Hf;

L is a carbon, silicon or germanium based divalent bridge in which one or two backbone atoms link the ligands;

$R^2$ and $R^{2'}$ are, independently from each other, H, —OSi$(C_{1\text{-}10}$-hydrocarbyl$)_3$, CHR$^{8'}$—$R^8$ group, with $R^8$ being H or linear or branched $C_{1\text{-}6}$-alkyl group, $C_{3\text{-}8}$-cycloalkyl group, $C_{6\text{-}10}$-aryl group, or an optionally substituted heteroaryl group having 3 to 20 carbon atoms, and $R^{8'}$ is H or a $C_{1\text{-}6}$ alkyl;

$R^{5\text{-}6}$ is hydrogen or a $C_1$-$C_{20}$-hydrocarbyl group optionally containing one or more heteroatoms from groups 14-16 of the periodic table of elements;

$R^{5'\text{-}6'}$ is hydrogen or a $C_1$-$C_{20}$-hydrocarbyl group optionally containing one or more heteroatoms from groups 14-16 of the periodic table of elements; or $R^5$ and $R^6$ can be taken together to form a 5 membered saturated carbon ring which is optionally substituted by n groups $R^{10}$, n being from 0 to 4; or $R^{5'}$ and $R^{6'}$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;

Ar is phenyl substituted by up to 5 groups $R^1$;

Ar' is phenyl, naphthyl, anthracenyl, pyridyl, thiophenyl, 2-alkylthiophenyl, benzothiophenyl, pyrrolyl, furanyl, 2-alkylfuranyl optionally substituted by up to 5 groups $R^1$; and $R^1$ are independently the same or can be different and are hydrogen, a linear or branched $C_1$-$C_6$-alkyl group, a $C_{7\text{-}20}$-arylalkyl, $C_{7\text{-}20}$-alkylaryl group or $C_{6\text{-}20}$-aryl group or an OY group, wherein Y is a $C_{1\text{-}10}$-hydrocarbyl group.

Further preferred metallocenes are of formula (XI)

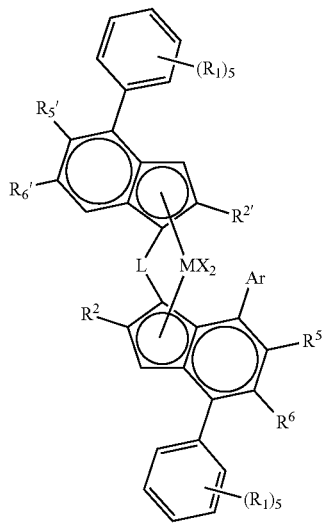

(XI)

each X independently is a sigma-donor ligand,

L is a carbon, silicon or germanium based divalent bridge in which one or two backbone atoms link the ligands;

each $R^1$ are independently the same or can be different and are hydrogen, a linear or branched $C_1$-$C_6$-alkyl group, a $C_{7\text{-}20}$-arylalkyl, $C_{7\text{-}20}$-alkylaryl group or $C_{6\text{-}20}$-aryl group or an OY group, wherein Y is a $C_{1\text{-}10}$-hydrocarbyl group, and optionally two adjacent $R^1$ groups can be part of a ring including the phenyl carbons to which they are bonded, $R^2$ and $R^{2'}$ independently are the same or can be different and are a CH $R^{8'}$—$R^8$ group, with $R^8$ being H or linear or branched $C_{1\text{-}6}$-alkyl group, $C_{3\text{-}8}$-cycloalkyl group, $C_{6\text{-}10}$-aryl group, or a heteroaryl group having 3 to 20 carbon atoms optionally substituted by one to three groups $R^{11}$; and $R^{8'}$ is H or a $C_{1\text{-}6}$ alkyl;

$R^5$ is hydrogen or an aliphatic $C_1$-$C_{20}$-hydrocarbyl group optionally containing one or more heteroatoms from groups 14-16 of the periodic table of elements;

$R^6$ is hydrogen or an aliphatic $C_1$-$C_{20}$-hydrocarbyl group optionally containing one or more heteroatoms from groups 14-16 of the periodic table of elements; or $R^5$ and $R^6$ can be taken together to form a 5 membered saturated carbon ring which is optionally substituted by n groups $R^{10}$, n being from 0 to 4;

$R^{5'}$ is hydrogen or an aliphatic $C_1$-$C_{20}$-hydrocarbyl group optionally containing one or more heteroatoms from groups 14-16 of the periodic table of elements;

$R^{6'}$ is hydrogen or an aliphatic $C_1$-$C_{20}$-hydrocarbyl group optionally containing one or more heteroatoms from groups 14-16 of the periodic table of elements; or $R^{5'}$ and $R^{6'}$ can be taken together to form a 5 membered saturated carbon ring which is optionally substituted by n groups $R^{10}$, n being from 0 to 4; and each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements.

In a more preferred embodiment, the metallocene complex may be of formula (XII)

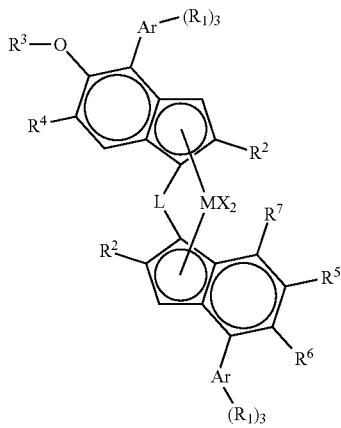

(XII)

each X independently is a sigma-donor ligand,

M is Zr or Hf;

L is a carbon, silicon or germanium based divalent bridge in which one or two backbone atoms link the ligands;

each Ar is an aryl or heteroaryl group having 3 to 20 carbon atoms, such as a phenyl ring or a 5 or 6 membered heteroaryl ring;

each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a CHR$^8$'—$R^8$ group, with $R^8$ being H or linear or branched $C_{1-6}$-alkyl group, $C_{3-8}$-cycloalkyl group, $C_{6-10}$-aryl group, or a heteroaryl group having 3 to 20 carbon atoms optionally substituted by one to three groups $R^{11}$, and $R^{5'}$ is H or a $C_{1-6}$ alkyl;

$R^3$ is a linear or branched $C_1$-$C_6$-alkyl group, $C_{7-20}$-arylalkyl, $C_{7-20}$-alkylaryl group or $C_6$-$C_{20}$-aryl group;

$R^4$ is a $C(R^9)_3$ group, with $R^9$ being a linear or branched $C_1$-$C_6$-alkyl group;

$R^5$ is hydrogen or an aliphatic $C_1$-$C_{20}$-hydrocarbyl group optionally containing one or more heteroatoms from groups 14-16 of the periodic table of elements;

$R^6$ is hydrogen or an aliphatic $C_1$-$C_{20}$-hydrocarbyl group optionally containing one or more heteroatoms from groups 14-16 of the periodic table of elements; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;

$R^7$ is a linear or branched $C_1$-$C_6$-alkyl group or an aryl or heteroaryl group having 3 to 20 carbon atoms optionally substituted by one to three groups $R^{11}$, such as a phenyl ring or a 5 or 6 membered heteroaryl ring;

each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group.

In a more preferred embodiment, the metallocene complex may be of formula (XIII)

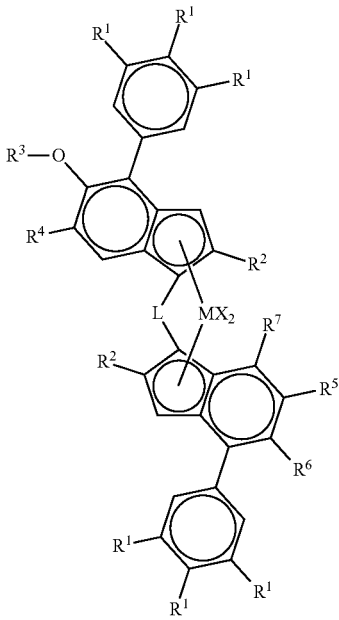

(XIII)

each X independently is a sigma-donor ligand,

M is Zr or Hf;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group, and optionally two adjacent $R^1$ groups can be part of a ring including the phenyl carbons to which they are bonded, each $R^2$ independently are the same or can be different and are a CH$_2$—$R^8$ group, with $R^8$ being H or linear or branched $C_{1-6}$-alkyl group, $C_{3-8}$ cycloalkyl group, $C_{6-10}$ aryl group, $R^3$ is a linear or branched $C_{1-6}$-alkyl group, $C_{7-20}$ arylalkyl, $C_{7-20}$ alkylaryl group or $C_6$-$C_{20}$-aryl group, $R^4$ is a $C(R^9)3$ group, with $R^9$ being a linear or branched $C_1$-$C_6$ alkyl group, $R^5$ is hydrogen or an aliphatic $C_1$-$C_{20}$ hydrocarbyl group optionally containing one or more heteroatoms from groups 14-16 of the periodic table of elements;

$R^6$ is hydrogen or an aliphatic $C_1$-$C_{20}$ hydrocarbyl group optionally containing one or more heteroatoms from groups 14-16 of the periodic table of elements; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$ hydrocarbyl group, or a $C_1$-$C_{20}$ hydrocarbyl radical optionally containing one or more heteroatoms belonging to groups 14-16 of the periodic table of elements;

$R^7$ is a linear or branched $C_1$-$C_6$-alkyl group or an aryl or heteroaryl group having 6 to 20 carbon atoms optionally substituted by one to 3 groups $R^{11}$, each $R^{11}$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group.

In a more preferred embodiment, the metallocene complex may be of formula (XIV)

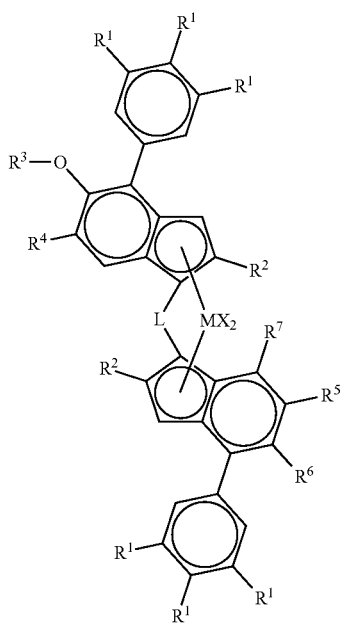

(XIV)

each X independently is a sigma-donor ligand;

M is Zr or Hf;

L is a divalent bridge selected from —R'$_2$C—, or —R'$_2$Si—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring;

each $R^1$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group, and optionally two adjacent $R^1$ groups can be part of a ring including the phenyl carbons to which they are bonded;

each $R^2$ independently are the same or can be different and are a CH$_2$—$R^8$ group, with $R^8$ being H or linear or branched $C_{1-8}$-alkyl group, $C_{3-8}$ cycloalkyl group, $C_{6-10}$ aryl group;

$R^3$ is a linear or branched $C_1$-$C_6$-alkyl group, $C_{7-20}$ arylalkyl, $C_{7-20}$ alkylaryl group or $C_6$-$C_{20}$-aryl group;

$R^4$ is a C(R$^9$)3 group, with $R^9$ being a linear or branched $C_1$-$C_6$ alkyl group;

$R^5$ is hydrogen;

$R^6$ is hydrogen; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$ hydrocarbyl group, or a $C_1$-$C_{20}$ hydrocarbyl radical optionally containing one or more heteroatoms belonging to groups 14-16 of the periodic table of elements;

$R^7$ is a linear or branched $C_1$-$C_6$-alkyl group or an aryl optionally substituted by one to 3 groups $R^{11}$, each $R^{11}$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group.

In a more preferred embodiment, the metallocene complex may be of formula (XV)

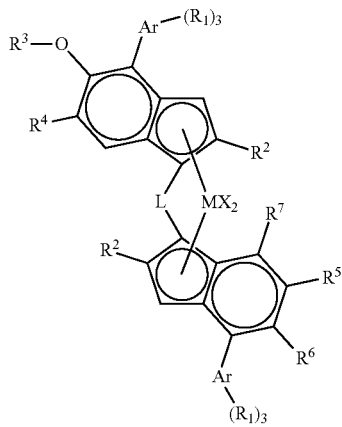

(XV)

each X independently is a sigma-donor ligand,

M is Zr or Hf;

L is a divalent bridge selected from —R'$_2$C—, or —R'$_2$Si—; wherein each R' is independently a $C_1$-$C_6$-alkyl, $C_{5-6}$-cycloalkyl, $C_{1-10}$-alkyl—O—$C_{1-10}$ alkyl or $C_6$-aryl group;

each Ar is a phenyl ring or a 5 or 6 membered heteroaryl ring;

each $R^1$ are independently the same or can be different and are hydrogen, a linear or branched $C_1$-$C_6$-alkyl group, each $R^2$ independently are the same or can be different and are a CHR$^{8'}$—$R^8$ group, with $R^8$ being H or linear or branched $C_{1-6}$-alkyl group, and R$^{8'}$ is H or a $C_{1-6}$ alkyl;

$R^3$ is a linear or branched $C_1$-$C_6$-alkyl group, $C_{7-20}$-arylalkyl, $C_{7-20}$-alkylaryl group or $C_6$-$C_{20}$-aryl group;

$R^4$ is a C(R$^9$)$_3$ group, with $R^9$ being a linear or branched $C_1$-$C_6$-alkyl group;

$R^5$ is hydrogen;

$R^6$ is hydrogen; or $R^5$ and $R^6$ can be taken together to form a 5 membered saturated carbon ring;

$R^7$ is a linear or branched $C_1$-$C_6$-alkyl group or an aryl or heteroaryl group having 3 to 20 carbon atoms optionally substituted by one to three groups $R^{11}$, such as a phenyl ring or a 5 or 6 membered heteroaryl ring optionally substituted by one to three groups $R^{11}$; and each $R^{11}$ are independently the same or can be different and are hydrogen, a linear or branched $C_1$-$C_6$-alkyl group.

In a more preferred embodiment, the metallocene complex may be of formula (XVI)

In a more preferred embodiment, the metallocene complex may be of formula (XVII)

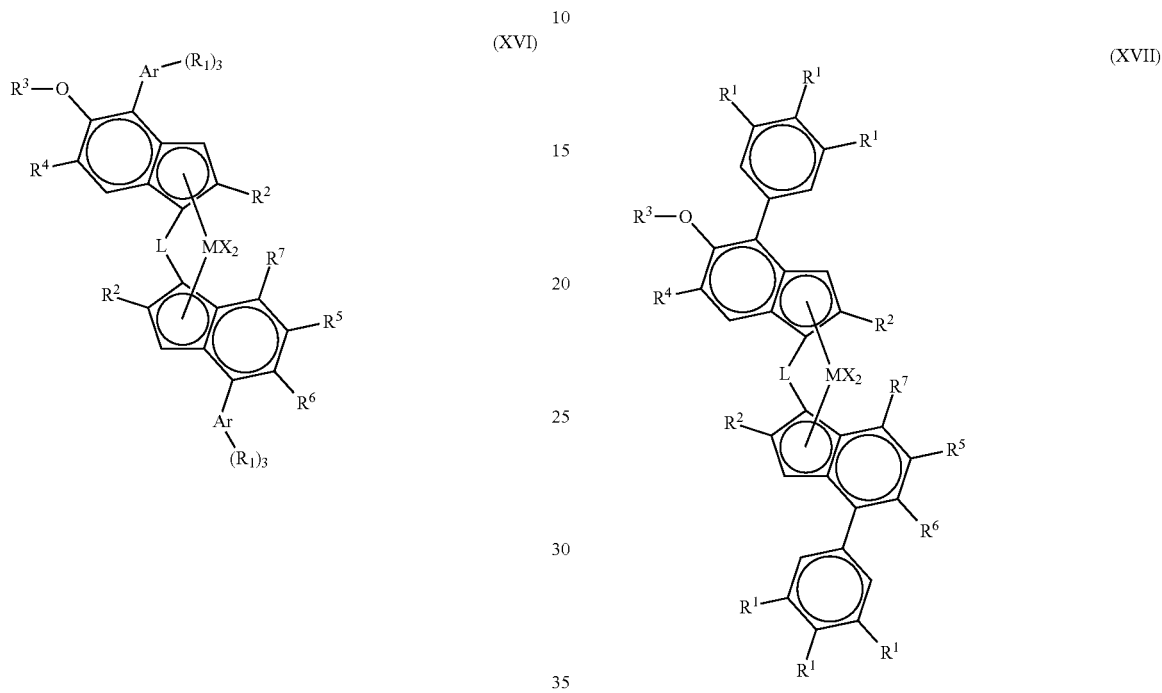

(XVI)

(XVII)

each X independently is a sigma-donor ligand;

M is Zr or Hf;

L is a divalent bridge selected from —R'$_2$C—, or —R'$_2$Si—; wherein each R' is independently a $C_1$-$C_6$-alkyl, $C_{5-6}$-cycloalkyl, $C_{1-10}$-alkyl—O—$C_{1-10}$ alkyl or $C_6$-aryl group;

each Ar is a phenyl ring or a 5 or 6 membered heteroaryl ring;

each $R^1$ are independently the same or can be different and are hydrogen, a linear or branched $C_1$-$C_6$-alkyl group, each $R^2$ independently are the same or can be different and are a CHR$^{8'}$—R$^8$ group, with R$^8$ being H or linear or branched $C_{1-6}$-alkyl group, and R$^{8'}$ is H or a $C_{1-6}$ alkyl;

$R^3$ is a linear or branched $C_1$-$C_6$-alkyl group;

$R^4$ is a C(R$^9$)$_3$ group, with R$^9$ being a linear or branched $C_1$-$C_6$-alkyl group;

$R^5$ and $R^6$ can be taken together to form a 5 membered saturated carbon ring;

$R^7$ is a phenyl ring or a 5 or 6 membered heteroaryl ring optionally substituted by one to three groups $R^{11}$; and each $R^{11}$ are independently the same or can be different and are hydrogen, a linear or branched $C_1$-$C_6$-alkyl group.

each X independently is a sigma-donor ligand,

M is Zr or Hf;

L is a divalent bridge selected from —R'$_2$C—, or —R'$_2$Si—; wherein each R' is independently a $C_1$-$C_6$-alkyl, $C_{5-6}$-cycloalkyl, $C_{1-10}$-alkyl—O—$C_{1-10}$ alkyl or $C_6$-aryl group;

each $R^1$ are independently the same or can be different and are hydrogen, a linear or branched $C_1$-$C_6$-alkyl group;

each $R^2$ independently are the same or can be different and are a CH$_2$—R$^8$ group, with R$^8$ being H or linear or branched $C_{1-6}$-alkyl group, $R^3$ is a linear or branched $C_1$-$C_6$-alkyl group, $R^4$ is a C(R$^9$)$_3$ group, with R$^9$ being a linear or branched $C_1$-$C_6$ alkyl group, $R^5$ is hydrogen;

$R^6$ is hydrogen; or $R^5$ and $R^6$ can be taken together to form a 5 membered saturated carbon ring;

$R^7$ is a phenyl group optionally substituted by one to 3 groups $R^{11}$, each $R^{11}$ are independently the same or can be different and are hydrogen, a linear or branched $C_1$-$C_6$-alkyl group.

In a more preferred embodiment, the metallocene complex may be of formula (XVIII)

In a more preferred embodiment, the metallocene complex may be of formula (XIX)

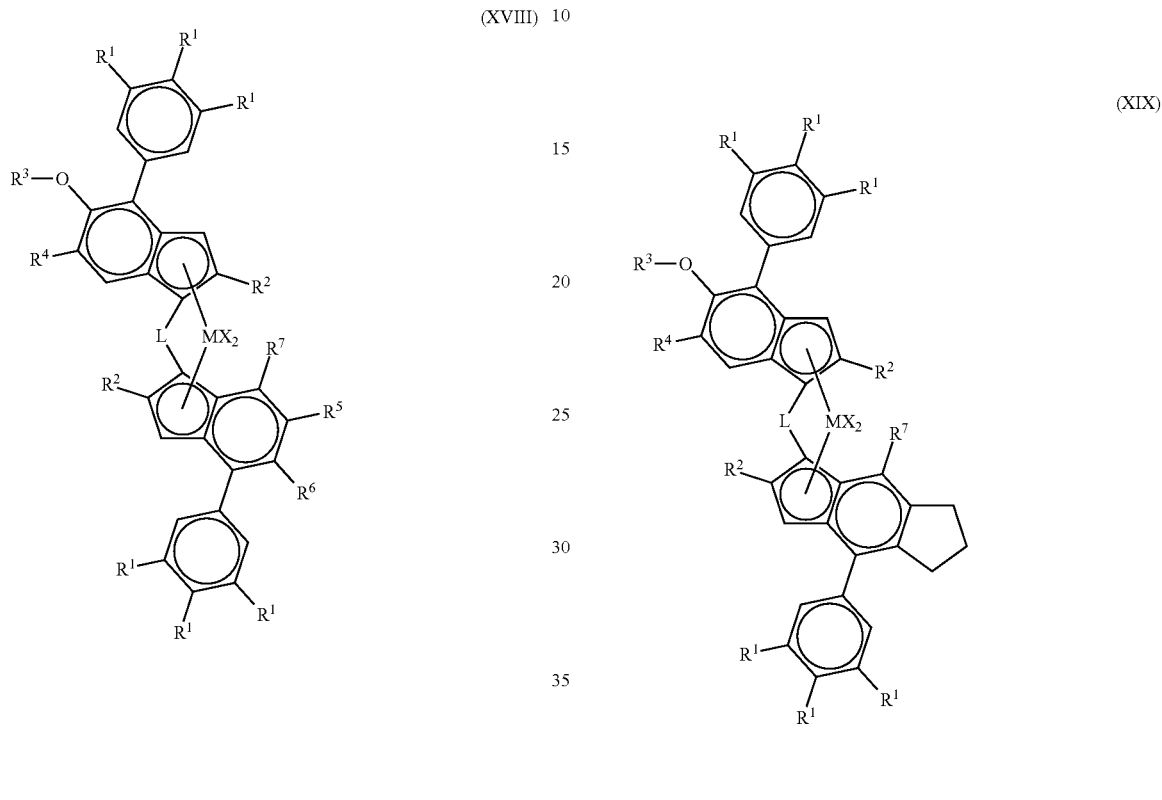

(XVIII)

(XIX)

each X independently is a sigma-donor ligand,

M is Zr or Hf;

L is —R'$_2$Si—; wherein each R' is independently a C$_1$-C$_6$-alkyl, C$_{5-6}$-cycloalkyl, C$_{1-10}$-alkyl-O—C$_{1-10}$ alkyl or C$_6$-aryl group;

each R$^1$ are independently the same or can be different and are hydrogen, a linear or branched C$_1$-C$_6$-alkyl group;

each R$^2$ is methyl;

R$^3$ is a linear or branched C$_1$-C$_6$-alkyl group,

R$^4$ is a C(R$^9$)3 group, with R$^9$ being a linear or branched C$_1$-C$_6$ alkyl group, R$^5$ is hydrogen;

R$^6$ is hydrogen; or

R$^5$ and R$^6$ can be taken together to form a 5 membered saturated carbon ring;

R$^7$ is a phenyl group optionally substituted by one to 3 groups R$^{11}$, each R$^{11}$ are independently the same or can be different and are hydrogen, a linear or branched C$_1$-C$_6$-alkyl group.

each X independently is a sigma-donor ligand,

M is Zr or Hf;

L is —R'$_2$Si—; wherein each R' is independently a C$_1$-C$_6$-alkyl, C$_{5-6}$-cycloalkyl, C$_{1-10}$-alkyl-O—C$_{1-10}$ alkyl or C$_6$-aryl group;

each R$^1$ are independently the same or can be different and are hydrogen, a linear or branched C$_1$-C$_6$-alkyl group;

each R$^2$ independently are the same or can be different and are a CH$_2$—R$^8$ group, with R$^8$ being H or linear or branched C$_1$-C$_6$-alkyl group;

R$^3$ is a linear or branched C$_1$-C$_6$-alkyl group,

R$^4$ is a C(R$^9$)3 group, with R$^9$ being a linear or branched C$_1$-C$_6$ alkyl group, R$^7$ is a phenyl group optionally substituted by one to 3 groups R$^{11}$, each R$^{11}$ are independently the same or can be different and are hydrogen, a linear or branched C$_1$-C$_6$-alkyl group.

In a more preferred embodiment, the metallocene complex may be of formula (XX)

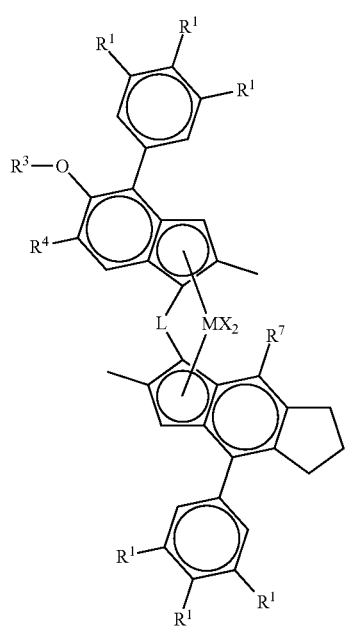

(XX)

each X independently is a sigma-donor ligand such as a halogen atom, a linear or branched $C_{1-4}$-alkyl or $C_{1-4}$-alkoxy group, a phenyl or benzyl group, M is Zr or Hf;

L is —$R'_2Si$—; wherein each R' is independently a $C_1$-$C_6$-alkyl, $C_{5-6}$-cycloalkyl, $C_{1-10}$-alkyl-O—$C_{1-10}$ alkyl or $C_6$-aryl group;

each $R^1$ are independently the same or can be different and are hydrogen, a linear or branched $C_1$-$C_6$-alkyl group;

$R^3$ is a linear or branched $C_1$-$C_6$-alkyl group, $R^4$ is a $C(R^9)3$ group, with $R^9$ being a linear or branched $C_1$-$C_6$ alkyl group, $R^7$ is a phenyl group optionally substituted by one to 3 groups $R^{11}$, each $R^{11}$ are independently the same or can be different and are hydrogen, a linear or branched $C_1$-$C_6$-alkyl group.

In a more preferred embodiment, the metallocene complex may be of formula (XXI)

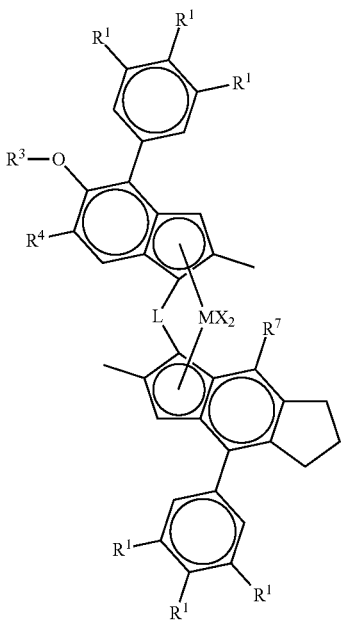

(XXI)

each X independently is a sigma-donor ligand such as a halogen atom, a linear or branched $C_{1-4}$-alkyl or $C_{1-4}$-alkoxy group, a phenyl or benzyl group, L is —$Me_2Si$—, each $R^1$ are independently the same or can be different and are hydrogen, a linear or branched $C_1$-$C_6$-alkyl group;

$R^3$ is a linear or branched $C_1$-$C_6$-alkyl group, $R^4$ is a $C(R^9)3$ group, with $R^9$ being a linear or branched $C_1$-$C_6$ alkyl group, $R^7$ is a phenyl group optionally substituted by one to 3 groups $R^{11}$, each $R^{11}$ are independently the same or can be different and are hydrogen, a linear or branched $C_1$-$C_6$-alkyl group.

Particularly preferred complexes of the invention include:

rac-dimethylsilanediyl-bis-[2-methyl-4-(3'5'dimethylphenyl)-5-methoxy-6-tert-butylinden-1-yl] zirconium dichloride, rac-anti-dimethylsilanediyl[2-methyl-4-(4'-tert.-butylphenyl)-inden-1-yl][2-methyl-4-(4''-tert.-butylphenyl)-5-methoxy-6-tert-butylinden-1-yl] zirconium dichloride, rac-anti-dimethylsilanediyl[2-methyl-4-(4'-tert.-butylphenyl)-inden-1-yl][2-methyl-4-phenyl-5-methoxy-6-tert-butylinden-1-yl] zirconium dichloride, rac-anti-dimethylsilanediyl[2-methyl-4-(3',5'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl] zirconium dichloride, rac-anti-dimethylsilanediyl[2-methyl-4,8-bis-(3',5'-dimethylphenyl)-1,5,6,7-tetrahydro-s-indacen-1-yl][2- methyl-4-(3',5'-ditert-butyl-phenyl)-5-methoxy-6-tert-butylinden-1-yl] zirconium dichloride,
or their Hf-analogues.

For the avoidance of doubt, any narrower definition of a substituent offered above can be combined with any other broad or narrowed definition of any other substituent. Throughout the disclosure above, where a narrower definition of a substituent is presented, that narrower definition is deemed disclosed in conjunction with all broader and narrower definitions of other substituents in the application.

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2015/158790 and WO2018/122134. The examples section also provides the skilled person with sufficient direction.

Cocatalyst

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (A):

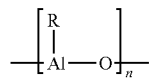

(A)

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (A).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst is used in combination with the aluminoxane cocatalyst. Boron containing cocatalysts of interest include those of formula (B)

$$BY_3 \quad (B)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate.

These compounds generally contain an anion of formula (C):

$$(Z)_4B^- \quad (C)$$

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate.

Suitable cationic counterions include triphenylcarbenium and are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: tributylammoniumtetrakis (pentafluorophenyl)borate, tributylammoniumtetrakis(trifluoromethylphenyl)borate, tributylammoniumtetrakis(4-fluorophenyl) borate, N,N-dimethylcyclohexylammoniumtetrakis(pentafluorophenyl) borate, N,N-dimethylbenzylammoniumtetrakis (pentafluorophenyl)borate, N,N-dimethylaniliniumtetrakis (pentafluorophenyl)borate, N,N-di(propyl) ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate or N,N-dimethylbenzylammoniumtetrakis(pentafluorophenyl) borate.

It has been surprisingly found that certain boron containing cocatalysts are especially preferred. Preferred borates of use in the invention therefore comprise the trityl, i.e. triphenylcarbenium ion. Thus, the use of $Ph_3CB(PhF_5)_4$ and analogues therefore are especially favoured.

Suitable amounts of cocatalyst will be well known to the person skilled in the art. Preferably, the amount of cocatalyst is chosen to reach below defined molar ratios. The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Catalyst System

The metallocene complex as described above is used in combination with a suitable cocatalyst combination as described above.

The catalyst system of the invention is used in supported form. The particulate support material used is an inorganic porous support such as a silica, alumina or a mixed oxide such as silica-alumina, in particular silica.

The use of a silica support is preferred.

Especially preferably, the support is a porous material so that the complex may be loaded into the pores of the particulate support, e.g. using a process analogous to those described in WO94/14856, WO95/12622, WO2006/097497 and EP18282666.

The average particle size of the support such as silica support can be typically from 10 to 100 μm. However, it has turned out that special advantages can be obtained, if the support has an average particle size from 15 to 80 μm, preferably from 18 to 50 μm.

The average pore size of the support such as silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

The catalyst can contain from 5 to 500 μmol, such as 10 to 100 μmol of transition metal per gram of support such as silica, and 3 to 15 mmol of Al per gram of support such as silica.

Preparation Steps

Step a)

In step a) the support such as silica support is reacted with aluminoxane cocatalyst.

Preferably, the reaction is done with the synthesis stoichiometry of Al in the aluminoxane to silica support in the range of 3-12 mmol Al/g $SiO_2$.

The support such as silica support is preferably calcined before step a) for removing moisture from the surface thereof. The calcination temperature is normally in the range of from 200 to 800° C., preferably in the range of from 400 to 650° C.

The support such as silica support is then suspended in a suitable hydrocarbon solvent, such as toluene. Suspending is done under inert gas atmosphere, e.g. under nitrogen, at a temperature of from 15° C. to 25° C.

The support/solvent, preferably silica/toluene, suspension is stirred for some minutes, preferably for 5 to 60 minutes, more preferably from 10 to 30 minutes.

Then aluminoxane cocatalyst, preferably MAO (e.g. as a 30 wt % solution in toluene), is added to the support/solvent such as silica/toluene suspension, preferably with a stoichiometry of 3-12 mmol Al/g $SiO_2$ or other support.

According to the present invention, not all of the aluminoxane is added in step a), but the main part of the total amount of aluminoxane cocatalyst. Thus 75.0 to 97.0 wt %, preferably 77.0 to 95.0 wt %, more preferably 85.0 to 92.0 wt %, of the total amount of aluminoxane cocatalyst are added in step a).

After addition of the aluminoxane cocatalyst the support/solvent/aluminoxane mixture is heated up to a temperature in the range of from 80° C. to 120° C., preferably from 95° C. to 115° C. and more preferably from 100° C. to 110° C.

The mixture is stirred for some minutes up to several hours, preferably from 60 minutes up to 5 hours, more preferably from 90 minutes up to 3 hours, at this temperature. Afterwards stirring is stopped, the so obtained slurry is allowed to settle and the mother liquor is removed, e.g. by filtering off or decantation.

Subsequently the remaining aluminoxane cocatalyst treated support such as silica support is preferably washed one or more times, e.g. once or twice, more preferably twice with toluene and optionally one more time with heptane at elevated temperature in a range of from 70° C. to 115° C., preferably from 80° C. to 110° C. and more preferably from 90° C. to 100° C.

Preferably, the aluminoxane cocatalyst treated support such as silica support is subsequently dried, preferably first at suitable temperatures, e.g. at 40 to 80° C., preferably at 50 to 70° C., more preferably at 58 to 62° C., under nitrogen atmosphere and subsequently under vacuum.

Step b)

In step b) the metallocene complex is reacted with aluminoxane cocatalyst in a suitable hydrocarbon solvent, such as toluene. Preferably, the same hydrocarbon solvent as in step a) is used.

In this step the remaining part of aluminoxane cocatalyst, preferably MAO (e.g. as a 30 wt % solution in toluene), i.e. 3.0 to 25.0 wt %, preferably 5.0 to 23.0 wt %, more preferably 8.0 to 13.0 wt %, of the total amount of aluminoxane cocatalyst are added in step b) to the metallocene complex and the so obtained solution is stirred for several minutes, preferably from 10 to 120 minutes, more preferably from 20 to 100 minutes and even more preferably from 40 to 80 minutes. Stirring is done at room temperature, e.g. at a temperature of from 15° C. to 25° C., preferably 18° C. to 22° C.

Step c)

To the solution of metallocene/aluminoxane cocatalyst in a suitable hydrocarbon solvent, preferably in toluene, (prepared in step b) the boron containing cocatalyst, like borate cocatalyst, is added to obtain a solution of the metallocene complex, boron containing cocatalyst and aluminoxane cocatalyst in a suitable hydrocarbon solvent, preferably in toluene.

The boron containing cocatalyst is added in an amount that a boron/M molar ratio of feed amounts in the range of 0.1:1 to 10:1 is reached. Preferably, the molar ratio of feed amounts boron/M is in the range of 0.3:1 to 7:1, more preferably 0.3:1 to 5.0:1, most preferably 0.3:1 to 3:1, e.g. 1:1. M is preferably Hf or Zr, more preferably Zr.

The so obtained solution is further stirred for several minutes, preferably from 10 to 120 minutes, more preferably from 20 to 100 minutes and even more preferably from 40 to 80 minutes. Stirring is done at a temperature of from 15° C. to 25° C., preferably 18° C. to 22° C.

Step d)

The solution obtained in step c) is then added to the aluminoxane cocatalyst treated support obtained in step a), yielding the supported catalyst system.

Step e)

In the final step, the so obtained supported catalyst system can optionally be washed with an appropriate hydrocarbon solvent such as toluene or heptane and optionally dried, preferably in vacuum to yield free flowing powder. If desired, the obtained supported catalyst system may be provided as an oil slurry with a desired solid content. The solid catalyst content in the slurry may be e.g. up to 30 wt-%, like up to 25 wt-%.

The amounts of support such as silica support, aluminoxane, preferably MAO, boron containing cocatalyst and metallocene depend on the desired above defined ratios (boron/M, Al/M, Al/SiO$_2$, M/SiO$_2$l; M being Hf or Zr, preferably Zr).

The process therefore includes
a) combining the porous inorganic support with aluminoxane cocatalyst in a hydrocarbon solvent to obtain aluminoxane cocatalyst treated support;
b) combining the metallocene complex with aluminoxane cocatalyst in a hydrocarbon solvent, wherein the amount of aluminoxane cocatalyst added in step a) is 75.0 to 97.0 wt % of the total amount of aluminoxane cocatalyst and the amount of aluminoxane cocatalyst added in step b) is 3.0 to 25.0 wt % of the total amount of aluminoxane cocatalyst;
c) adding the boron containing cocatalyst to the solution obtained in step b) to obtain a solution of metallocene complex, boron containing cocatalyst and aluminoxane cocatalyst whereby the boron containing cocatalyst is added in an amount that a boron/M molar ratio of feed amounts in the range of 0.1:1 to 10:1 is reached;
d) adding the solution obtained in step c) to the aluminoxane cocatalyst treated support obtained in step a) and optionally
e) drying the so obtained supported catalyst system.

Polymerization

The catalyst system as prepared according to the present invention is especially suited to the formation of propylene homopolymers or copolymers, especially with ethylene, with high activity levels, high molecular weight, and hence low MFR, and with ideal melting points polymer.

Polymerization in the method of the invention may be effected in one or more, e.g. 1, 2 or 3, polymerization reactors, using conventional polymerization techniques, e.g. gas phase, solution phase, slurry or bulk polymerization or combinations thereof, like a combination of a slurry and at least one gas phase reactor.

The process may also involve a prepolymerization step. This prepolymerization step is a conventional step used routinely in polymer synthesis and is to be distinguished from the catalyst off-line prepolymerization step used for catalysts prepared with the emulsion/solidification technology, as discussed in the state of the art.

Generally, the quantity of catalyst used will depend upon the nature of the catalyst, the reactor types and conditions and the properties desired for the polymer product. As is well known in the art hydrogen can be used for controlling the molecular weight of the polymer.

The catalyst system prepared according to the invention especially possess excellent catalyst activity and is also able to provide polymers of high weight average molecular weight Mw.

For bulk and gas phase copolymerization reactions, the reaction temperature used will generally be in the range 60 to 115° C. (e.g. 70 to 90° C.), the reactor pressure will generally be in the range 10 to 25 bar for gas phase reactions with bulk polymerization operating at slightly higher pressures. The residence time will generally be 0.25 to 8 hours (e.g. 0.5 to 4 hours). The gas used will be the monomer optionally as mixture with a non-reactive gas such as nitrogen or propane. It is a particular feature of the invention that polymerization takes place at temperatures of at least 60° C.

Polymers

It is a feature of the invention that the claimed catalysts enable the formation of polymers with high molecular weight. These features can be achieved at commercially interesting polymerization temperatures, e.g. 60° C. or more. It is a preferred feature of the invention that the catalysts of the invention are used to polymerize propylene at a temperature of at least 60° C., preferably at least 70° C., such as at least 80° C. In a particular embodiment, the propylene polymers obtained using the catalysts of the invention have a polydispersity index (Mw/Mn) of 2.0 or greater, such as 2.2-4.5.

Polypropylene Homopolymers

Polypropylene homopolymers made by the catalyst system prepared according to the invention can be made with Mw (weight average molecular weight) values in the range of 50 to 2000 kg/mol, preferably in the range of 100 to 1500 kg/mol, more preferably in the range of 150 to 1000 kg/mol, even more preferably 200 to 800 kg/mol, depending on the use and amount of hydrogen used as Mw regulating agent. The catalysts of the invention enable the formation of polypropylene homopolymers with high melting points. In a preferred embodiment the propylene homopolymer formed by the process of the invention has a melting point of more than 149.0° C., preferably more than 149.5° C., especially more than 150.0° C. Propylene homopolymers having melting points up to 158.0° C., or even up to 160.0° C. are possible.

The polymers made by the catalysts of the invention are useful in all kinds of end articles such as pipes, films (cast, blown or BOPP films, such as for example BOPP for capacitor film), fibers, moulded articles (e.g. injection moulded, blow moulded, rotomoulded articles), extrusion coatings and so on.

The invention will now be illustrated by reference to the following non-limiting Examples.

Measurement Methods (a) Melt Flow Rate (MFR)

The melt flow rate is measured as the MFR$_2$ in accordance with ISO 1133 15 (230° C., 2.16 kg load) for polypropylene. The MFR is an indication of the flowability, and hence the processability, of the polymer. The higher the melt flow rate, the lower the viscosity of the polymer.

(b) Number Average Molecular Weight (Mn), Weight Average Molecular Weight (Mw) and Polydispersity (Mw/Mn)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N}(A_i/M_i)} \quad (1)$$

$$M_w = \frac{\sum_{i=1}^{N}(A_i \times M_i)}{\sum_{i=1}^{N} A_i} \quad (2)$$

$$M_Z = \frac{\sum_{i=1}^{N}(A_i \times M_i^2)}{\sum_{i=1}^{N}(A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 µL of sample solution was injected per analysis. Data collection was performed using either Agilent Cirrus software version 3.3 or PolymerChar GPC-IR control software.

The column set was calibrated using universal calibration (according to ISO 16014-2:2003) with minimum 12 narrow MWD polystyrene (PS) standards in the range of 0.37 kg/mol to 13 200 kg/mol. The PS standards were dissolved at room temperature over several hours or alternatively for 30 minutes at 160° C. The conversion of the polystyrene peak molecular weight to polyolefin molecular weights is accomplished by using the Mark Houwink equation and the following Mark Houwink constants:

$K_{PS} = 19 \times 10^{-3}$ mL/g, $\alpha_{PS} = 0.655$ $K_{PE} = 39 \times 10^{-3}$ mL/g, $\alpha_{PE} = 0.725$ $K_{PP} = 19 \times 10^{-3}$ mL/g, $\alpha_{PP} = 0.725$ A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

(c) DSC Analysis, Peak Melting Temperature ($T_m$)

Differential Scanning calorimetry (DSC) experiments were run on a Mettler Toledo DSC2 device calibrated with Indium, Zinc, and Tin according to ISO 11357/1. The measurements were run under nitrogen atmosphere (50 mL min-1) on 6±1 mg samples in a heat/cool/heat cycle with a scan rate of 10° C./min between 30° C. and 225° C. according to ISO 11357/3. Crystallisation (Tc) and melting (Tm) temperatures were taken as the peaks of the endotherms and exotherms in the cooling cycle and the second heating cycle respectively.

(d) Catalyst Activity

The catalyst activity was calculated on the basis of following formula:

$$\text{Catalyst Activity (kg-}PP/\text{g-}Cat/\text{h)} = \frac{\text{amount of polymer produced (kg)}}{\text{catalyst loading (g)} \times \text{polymerisation time (h)}}$$

(e) Metal Activity

Metal activity (M activity) was calculated on the basis of following formula:

$$M \text{ Activity (kg-}PP/\text{g-}M/\text{h)} = \frac{\text{amount of polymer produced (kg)}}{\text{catalyst loading (g)} \times \text{polymerization time (h)}}$$

wherein the catalyst loading refers to the grams of transition metal (M) present in the catalyst.

(f) Al, B and Zr Determination (ICP-Method)

In a glovebox, an aliquot of the catalyst (ca. 40 mg) was weighed into glass weighting boat using analytical balance. The sample was then allowed to be exposed to air overnight while being placed in a steel secondary container equipped with an air intake. Then 5 mL of concentrated (65%) nitric acid was used to rinse the content of the boat into the Xpress microwave oven vessel (20 mL). A sample was then subjected to a microwave-assisted digestion using MARS 6 laboratory microwave unit over 35 minutes at 150° C. The digested sample was allowed to cool down for at least 4 h and then was transferred into a glass volumetric glass flask of 100 mL volume. Standard solutions containing 1000 mg/L Y and Rh (0.4 mL) were added. The flask was then filled up with distilled water and shaken well. The solution was filtered through 0.45 µm Nylon syringe filters and then subjected to analysis using Thermo iCAP 6300 ICP-OES and iTEVA software.

The instrument was calibrated for Al, B, Hf, Mg, Ti and Zr using a blank (a solution of 5% $HNO_3$) and six standards of 0.005 mg/L, 0.01 mg/L, 0.1 mg/L, 1 mg/L, 10 mg/L and 100 mg/L of Al, B, Hf, Mg, Ti and Zr in solutions of 5% $HNO_3$ distilled water. However, not every calibration point was used for each wavelength. Each calibration solution contained 4 mg/L of Y and Rh standards. Al 394.401 nm was calibrated using the following calibration points: blank, 0.1 mg/L, 1 mg/L, 10 mg/L and 100 mg/L. Al 167.079 nm was calibrated as Al 394.401 nm excluding 100 mg/L and Zr 339.198 nm using the standards of blank, 0.01 mg/L, 0.1 mg/L, 1 mg/L, 10 mg/L and 100 mg/L. Curvilinear fitting and 1/concentration weighting was used for the calibration curves.

Immediately before analysis the calibration was verified and adjusted (instrument reslope function) using the blank and a 10 mg/L Al, B, Hf, Mg, Ti and Zr standard which had 4 mg/L Y and Rh. A quality control sample (QC: 1 mg/L Al, Au, Be, Hg & Se; 2 mg/L Hf & Zr, 2.5 mg/L As, B, Cd, Co, Cr, Mo, Ni, P, Sb, Sn & V; 4 mg/L Rh & Y; 5 mg/L Ca, K, Mg, Mn, Na & Ti; 10 mg/L Cu, Pb and Zn; 25 mg/L Fe and 37.5 mg/L Ca in a solution of 5% HNO3 in distilled water) was run to confirm the reslope for Al, B, Hf, Mg, Ti and Zr. The QC sample was also run at the end of a scheduled analysis set.

The content for Zr was monitored using Zr 339.198 nm {99} line. The content of aluminium was monitored via the 167.079 nm {502} line, when Al concentration in test portion was under 2 wt % and via the 394.401 nm {85} line for Al concentrations above 2 wt %. Y 371.030 nm {91} was used as internal standard for Zr 339.198 nm and Al 394.401 nm and Y 224.306 nm {450} for Al 167.079 nm. The content for B was monitored using B 249 nm line.

The reported values were back calculated to the original catalyst sample using the original mass of the catalyst aliquot and the dilution volume.

Catalyst Complex

The catalyst complex used in the polymerization processes for propylene homopolymer used for the inventive examples 1E1 and 1E2 as well as for the comparative examples CE1 to CE5 was:

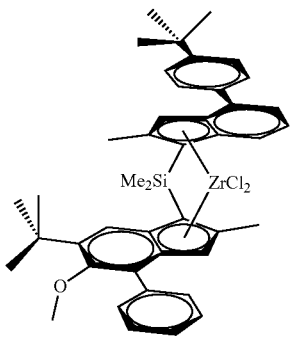

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650, E2.

The catalyst system was prepared using metallocene MC1 and a cocatalyst system of MAO and trityl tetrakis(pentafluorophenyl)borate. The catalyst was supported onto silica.

The catalyst complex MC2 used in the polymerization processes for propylene homopolymer for the inventive example IE3 as well as for the comparative examples CE6 to CE7 was

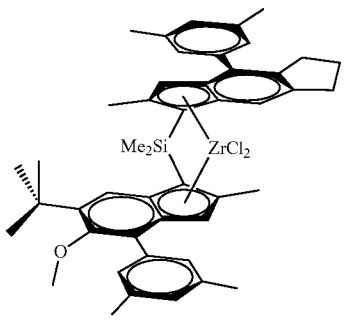

(rac-anti-dimethylsilanediyl(2-methyl-4-(3',5'-dimethylphenyl)-1,5,6,7-tetrahydro-s-indacen-1-yl)(2-methyl-4-(3',5'-dimethylphenyl)-5-methoxy-6-tert-butyl inden-1-yl) zirconium dichloride) synthesized according to the procedure as described in WO2019/007655, pp 49ff.

The catalyst system was prepared using metallocene MC2 and a cocatalyst system of MAO and trityl tetrakis(pentafluorophenyl)borate. The catalyst was supported onto silica for IE3.

The catalyst complex MC3 used in the polymerization processes for propylene homopolymer for the inventive examples IE4 as well as for the comparative examples CE8 was

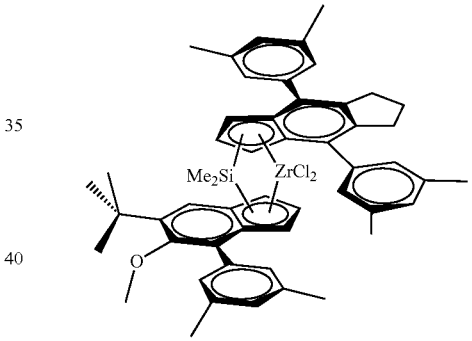

rac-anti-dimethylsilanediyl[2-methyl-4,8-bis(3',5'-dimethyl phenyl)-1,5,6,7-tetrahydro-s-indacen-1-yl][2-methyl-4-(3',5'-dimethylphenyl)-5-methoxy-6-tert-butylinden-1-yl]zirconium dichloride synthesized as described in the international application PCT/EP2019/056737 (Synthesis of MC-2)

Preparation of MAO-Silica Support (Option 1)

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32.2 kg) was added. The mixture was stirred (40 rpm) for 15 min. Next 30 wt % solution of MAO in toluene (17.5 kg) from Lanxess was added via 12 mm line on the top of the reactor within 70 min. The reaction mixture was then heated up to 90° C. and stirred at 90° C. for additional two hours. The slurry was allowed to settle and the mother liquor was filtered off. The MAO treated silica support was washed twice with toluene (32.2 kg) at 90° C., following by settling and filtration. The reactor was cooled off to 60° C. and the solid was washed with heptane (32.2 kg). Finally MAO treated $SiO_2$ was dried at 60° C. for 2 h under nitrogen flow 2 kg/h, pressure 0.3 barg and then for 5 hours under vacuum (−0.5 barg) with stirring at 5 rpm. MAO treated support was collected as a free-flowing white powder found to contain 12.7% Al by weight.

This support is used for inventive examples ICS1ICS4, ICS6, ICS7 and comparative examples CCS1 to CCS6, and CCS8. In comparative examples CCS6 and CCS7 no silica was used.

ICS 1 (Inventive Catalyst System 1): Catalyst Preparation

In a nitrogen filled glovebox, a solution of MAO 0.25 mL (30% wt in toluene, AXION 1330 CA Lanxess) in dry toluene (1 mL) was added to an aliquot of metallocene MC1 (30.0 mg, 38 μmol). The mixture was stirred for 60 minutes at room temperature. Next, trityl tetrakis(pentafluorophenyl) borate (35.6 mg, 38 μmol) was added to the mixture, and the mixture was stirred for another hour at rt. 1.0 g of MAO treated silica prepared as described above, was placed in a glass flask. A solution of metallocene, borate and MAO in toluene was then slowly added to the support over the course of 5 minutes with gentle mixing. The resulting mixture was shaken well and allowed to stay overnight. The resulting cake was dried in vacuum for 1 hour to yield 1.1 g of the catalyst as pink free flowing powder containing 13.4 wt % Al and 0.27 wt % Zr according to the ICP analysis.

ICS 2 (Inventive Catalyst System 2): Catalyst Preparation

ICS 2 was prepared as described for ICS 1, with the exception that 36.0 mg of trityl tetrakis(pentafluorophenyl) borate were added and the catalyst was washed with 5 mL of toluene after an overnight stay, and then subjected to drying.

CCS 1 (Comparative Catalyst System 1): Catalyst Preparation

In a nitrogen filled glovebox, solution of MAO 0.25 mL (30% wt in toluene, AXION 1330 CA Lanxess) in dry toluene (1 mL) was added to an aliquot of metallocene MC1 (30.0 mg, 38 μmol). The mixture was stirred for 60 minutes at room temperature. Next, the solution was slowly added to 1.0 g of MAO treated silica prepared as described above, which was placed in a glass flask. The mixture was allowed to stay overnight and was then subjected to vacuum drying for 1 hour to yield pink free-flowing powder. A solution of trityl tetrakis(pentafluorophenyl) borate (35.6 mg, 38 μmol) in 1 ml of toluene was then added slowly to the metallocene-MAO impregnated support. The mixture was shaken well and allowed to stay overnight. The resulting cake was dried in vacuum for 1 hour to yield 1.1 g of the catalyst as pink free flowing powder.

CCS 2 (Comparative Catalyst System 2): Catalyst Preparation

In a nitrogen filled glovebox, a solution of trityl tetrakis (pentafluorophenyl) borate (35.6 mg, 38 μmol) in 1 ml of toluene was added slowly to 1.0 g of MAO treated silica prepared as described above, which was placed in a glass flask. The mixture was allowed to stay overnight and was then subjected to vacuum drying for 1 hour to yield white free-flowing powder. In a separate flask, solution of MAO 0.25 mL (30% wt in toluene, AXION 1330 CA Lanxess) in dry toluene (1 mL) was added to an aliquot of metallocene MC1 (30.0 mg, 38 μmol). The mixture was stirred for 60 minutes at room temperature. Next, a solution of metallocene, and MAO in toluene was then slowly added to the borate-treated support over the course of 5 minutes with gentle mixing. The resulting mixture was shaken well and allowed to stay overnight. The resulting cake was dried in vacuum for 1 hour to yield 1.2 g of the catalyst as pink free flowing powder.

CCS3 (Comparative Catalyst System 3) Catalyst Preparation

In a nitrogen filled glovebox, solution of MAO 0.25 mL (30% wt in toluene, AXION 1330 CA Lanxess) in dry toluene (1 mL) was added to an aliquot of metallocene MC1 (30.0 mg, 38 μmol). The mixture was stirred for 60 minutes at room temperature. Next, the solution was slowly added to 1.0 g of MAO treated silica prepared as described above, which was placed in a glass flask. The mixture was allowed to stay overnight, washed with 5 mL of toluene and was then subjected to vacuum drying for 1 hour to yield pink free-flowing powder. A solution of trityl tetrakis(pentafluorophenyl) borate (35.6 mg, 38 μmol) in 1 ml of toluene was then added slowly to the metallocene-MAO impregnated support. The mixture was shaken well and allowed to stay overnight and then washed with 5 mL of toluene. The resulting cake was dried in vacuum for 1 hour to yield 1.0 g of the catalyst as pink free flowing powder.

CCS 4 (Comparative Catalyst System 4): Catalyst Preparation

In a nitrogen filled glovebox, a solution of trityl tetrakis (pentafluorophenyl) borate (35.6 mg, 38 μmol) in 1 ml of toluene was added slowly to 1.0 g of MAO treated silica prepared as described above, which was placed in a glass flask. The mixture was allowed to stay overnight, washed with 5 mL of toluene and was then subjected to vacuum drying for 1 hour to yield white free-flowing powder. In a separate flask, solution of MAO 0.25 mL (30% wt in toluene, AXION 1330 CA Lanxess) in dry toluene (1 mL) was added to an aliquot of metallocene MC1 (30.0 mg, 38 μmol). The mixture was stirred for 60 minutes at room temperature. Next, A solution of metallocene, and MAO in toluene was then slowly added to the borate-treated support over the course of 5 minutes with gentle mixing. The resulting mixture was shaken well and allowed to stay overnight. The resulting cake was washed with 5 mL toluene, and then dried in vacuum for 1 hour to 1.1 g of the catalyst as pink free flowing powder.

CCS 5 (Comparative Catalyst System 5): Catalyst Preparation

In a nitrogen filled glovebox, a solution of MAO 0.25 mL (30% wt in toluene, AXION 1330 CA Lanxess) in dry toluene (1 mL) was added to an aliquot of metallocene MC1 (30.0 mg, 38 μmol). The mixture was stirred for 60 minutes at room temperature. Next, the solution was slowly added to 1.0 g of MAO treated silica prepared as described above, which was placed in a glass flask. The mixture was allowed to stay overnight, washed with 5 mL of toluene and was then subjected to vacuum drying for 1 hour to yield pink free-flowing powder to yield 1.1 g of the catalyst as pink free flowing powder.

ICS 3 (Inventive Catalyst System 3): Catalyst Preparation

In a nitrogen filled glovebox, a solution of MAO 0.2 mL (30% wt in toluene, AXION 1330 CA Lanxess) in dry toluene (2.5 mL) was added to an aliquot of metallocene MC2 (2.5 mg, 28 μmol). The mixture was stirred for 60 minutes at room temperature. Next, trityl tetrakis(pentafluorophenyl) borate (25.6 mg, 28 μmol) was added to the mixture, and the mixture was stirred for another hour at rt. 2.0 g of MAO treated silica prepared as described above, was placed in a glass flask. A solution of metallocene, Borate and MAO in toluene was then slowly added to the support over the course of 5 minutes with gentle mixing. The resulting mixture was shaken well and allowed to stay for 1 hour. The resulting cake was dried in vacuum for 1 hour to yield 2.1 g of the catalyst as pink free flowing powder containing 12.9 wt % Al and 0.095 wt % Zr according to the ICP analysis. B/Zr mol/mol=1; 17 mmol Zr/g $SiO_2$

ICS 4 (Inventive Catalyst System 4): Catalyst Preparation

In a nitrogen filled glovebox, a solution of MAO 0.12 mL (30% wt in toluene, AXION 1330 CA Lanxess) in dry toluene (1 mL) was added to an aliquot of metallocene MC3 (17.6 mg, 19 μmol). The mixture was stirred for 60 minutes at room temperature. Next, trityl tetrakis(pentafluorophenyl) borate (18.0 mg, 20 μmol) was added to the mixture, and the mixture was stirred for another hour at rt. 1.0 g of MAO treated silica prepared as described above, was placed in a glass flask. A solution of metallocene, Borate and MAO in toluene was then slowly added to the support over the course of 5 minutes with gentle mixing. The resulting mixture was shaken well and allowed to stay overnight. The resulting cake was washed with 5 mL of toluene at room temperature, and then was dried in vacuum for 1 hour to yield 1.2 g of the catalyst as pink free flowing powder containing 11.3 wt % Al and 0.089 wt % Zr according to the ICP analysis

CCS6 (Comparative Catalyst System 6)

The same catalyst complex as for ICS3 (i.e. MC2) was used, but no silica support. Inside the glovebox, 234.3 mg of dry and degassed surfactant S2 (in 0.2 mL toluene) were added dropwise to 5 mL of MAO. The solution was left under stirring for 30 minutes. Then, 95.6 mg of MC2 were added to the MAO/surfactante solution. After 60 minutes stirring, 104.9 mg of trityl tetrakis(pentafluorophenyl)borate were added.

After 60 minutes stirring, 5 mL of the surfactant-MAO-metallocene-borate solution was successively added into a 50 mL emulsification glass reactor containing 40 mL of PFC (perfluoro-1.3-dimethylcyclohexane) at −10° C. and equipped with an overhead stirrer (stirring speed=600 rpm). A red emulsion formed immediately and was stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The catalyst was left to settle up on top of the PFC and after 35 minutes the solvent was siphoned off. The remaining catalyst was dried during 2 hours at 50° C. under argon flow. 0.70 g of a red free flowing powder was obtained. (Al 28.7 wt %, Zr 0.53 wt % Al/Zr (molar) 182; B/Zr (molar) 0.98)

S2: 1H,1H-Perfluoro(2-methyl-3-oxahexan-1-ol) (CAS 26537-88-2) purchased from Unimatec, dried over activated molecular sieves (2 times) and degassed by argon bubbling prior to use.

CCS7 (Comparative Catalyst System 7) (Off-Line Prepol)

The comparative catalyst system 7 (CCS7) was prepared as described for CCS6 above, but with a subsequent off-line prepolymerization step.

The off-line pre-polymerization step was done in a 125 mL pressure reactor equipped with gas-feeding lines and an overhead stirrer. Dry and degassed perfluoro-1.3-dimethylcyclohexane (15 cm$^3$) and the desired amount of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached. The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

(Al 4.4 wt %, Zr 0.082 wt % Al/Zr (molar) 182; B/Zr (molar) 0.98)

The prepolymerization degree (weight of polymer/weight of solid catalyst before prepolymerization step) was 5.47.

CCS8 (Comparative Catalyst System 8)

The comparative catalyst system CCS8 was prepared according the preparation of CCS3, except that metallocene MC3 (17.6 mg, 19 μmol) and trityl tetrakis(pentafluorophenyl) borate (18 mg, 19 μmol) were used. 1.1 g of the catalyst was isolated in the form of pink free-flowing powder.

Support for Example ICS5 to CCS9 and CCS10

Preparation of MAO-Silica Support (Option 2)

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (21.8 kg) was added. The mixture was stirred (40 rpm) for 15 min. Next 30 wt % solution of MAO in toluene (9.0 kg) from Lanxess was added via 12 mm line on the top of the reactor within 70 min. The reaction mixture was then heated up to 90° C. and stirred at 90° C. for additional two hours. The slurry was allowed to settle and the mother liquor was filtered off. The catalyst was washed twice with toluene (21.8 kg) at 90° C., following by settling and filtration. The reactor was cooled off to 60° C. and the solid was washed with heptane (21.8 kg). Finally MAO treated $SiO_2$ was dried at 60° C. for 2 h under nitrogen flow 2 kg/h, pressure 0.3 barg and then for 5 hours under vacuum (−0.5 barg) with stirring at 5 rpm. MAO treated support was collected as a free-flowing white powder found to contain 13.0% Al by weight.

ICS 5 (Inventive Catalyst System 5): Catalyst Preparation

In a nitrogen filled glovebox, a solution of MAO 0.2 mL (30% wt in toluene, AXION 1330 CA Lanxess) in dry toluene (2.3 mL) was added to an aliquot of metallocene MC3 (17.6 mg, 19 µmol). The mixture was stirred for 30 minutes at room temperature. Then, an aliquot of trityl tetrakis(pentafluorophenyl)borate (26.5 mg, 28 µmol) was added and the mixture was stirred for an additional 30 min. Next, 2.0 g of MAO treated silica (option 2) prepared as described above, was placed in a glass vial. A solution of metallocene, trityl tetrakis(pentafluorophenyl) borate and MAO in toluene was then slowly added to the support over the course of 5 minutes with gentle mixing. The resulting mixture was shaken well and allowed to stay for 1 hour. The resulting solid was dried in vacuum for 1 hour to yield 2.0 g of the catalyst as pink free flowing powder.

ICS6 (Inventive Catalyst System 6): Catalyst Preparation

In a nitrogen filled glovebox, a solution of MAO 0.25 mL (30% wt in toluene, AXION 1330 CA Lanxess) in dry toluene (2.0 mL) was added to an aliquot of metallocene MC3 (35.1 mg, 38.3 µmol). The mixture was stirred for 60 minutes at room temperature. Next, trityl tetrakis(pentafluorophenyl) borate (54.8 mg, 59.4 µmol) was added to the mixture, and the mixture was stirred for another hour at room temperature. 2.0 g of MAO treated silica prepared as described above (option 1), was placed in a glass flask. A solution of metallocene, trityl tetrakis(pentafluorophenyl) borate and MAO in toluene was then slowly added to the support over the course of 5 minutes with gentle mixing. The resulting mixture was shaken well and allowed to stay overnight. The resulting cake was washed with 10 mL of toluene at room temperature, and then was dried in vacuum for 1 hour to yield 2.1 g of the catalyst as pink free flowing powder.

ICS 7 (Inventive Catalyst System 7): Catalyst Preparation

ICS7 was prepared in a similar way as ICS6 except 35.2 mg (38 µmol) of MC3 was used and 31.6 mg (38 µmol, 39 umol) of N,N-dimethylanilinium tetrakis(pentafluorophenyl)borate were used instead of trityl tetrakis(pentafluorophenyl) borate (provided by Boulder Corp).

CCS 9 (Comparative Catalyst System 9): Catalyst Preparation

In a nitrogen filled glovebox, a solution of MAO 0.2 mL (30% wt in toluene, AXION 1330 CA Lanxess) in dry toluene (2.3 mL) was added to an aliquot of trityl tetrakis (pentafluorophenyl) borate (26.5 mg, 28 µmol). The mixture was stirred for 30 minutes at room temperature. Then, an aliquot of metallocene MC-3 (17.6 mg, 19 µmol) was added and the mixture was stirred for an additional 30 min. Next, 2.0 g of MAO treated silica (option 2) prepared as described above, was placed in a glass vial. A solution of metallocene, MAO and trityl tetrakis(pentafluorophenyl) borate in toluene was then slowly added to the support over the course of 5 minutes with gentle mixing. The resulting mixture was shaken well and allowed to stay for 1 hour. The resulting solid was dried in vacuum for 1 hour to yield 2.0 g of the catalyst as pink free flowing powder.

CCS10 (Comparative Catalyst System 10): Catalyst Preparation

In a nitrogen filled glovebox, a solution of MAO 0.2 mL (30% wt in toluene, AXION 1330 CA Lanxess) in dry toluene (2.3 mL) was added to an aliquot of metallocene MC-3 (17.6 mg, 19 µmol). The mixture was stirred for 30 minutes at room temperature. Next, 2.0 g of MAO treated silica (option 2) prepared as described above, was placed in a glass vial. A solution of metallocene, and MAO in toluene was then slowly added to the support over the course of 5 minutes with gentle mixing. The resulting mixture was shaken well and allowed to stay for 1 hour. The resulting solid was dried in vacuum for 1 hour to yield a pink powder. Then, an aliquot of trityl tetrakis(pentafluorophenyl) borate (26.5 mg, 28 µmol) was added to a fresh vial and dissolved in toluene (2 mL). The solution of trityl tetrakis(pentafluorophenyl) borate in toluene was added to the solid obtained before over the course of 5 minutes with gentle mixing. The resulting mixture was shaken well and allowed to stay for 1 hour. The resulting solid was dried in vacuum for 1 hour to yield 2.0 g of the catalyst as pink free flowing powder.

TABLE 1

Catalysts

| Metallocene | catalyst system | Al wt % | Zr wt % | Al/Zr molar | B/Zr* molar |
|---|---|---|---|---|---|
| MC1 | ICS 1 | 14.0 | 0.282 | 168 | 1 |
| MC1 | ICS 2 | 12.8 | 0.290 | 149 | 1 |
| MC1 | CCS 1 | 14.0 | 0.299 | 158 | 1 |
| MC1 | CCS 2 | 14.0 | 0.308 | 154 | 1 |
| MC1 | CCS 3 | 12.8 | 0.212 | 204 | 1 |
| MC1 | CCS 4 | 13.1 | 0.255 | 174 | 1 |
| MC1 | CCS 5 | 12.5 | 0.248 | 170 | 0 |
| MC2 | ICS3 | 12.8 | 0.095 | 457 | 1 |
| MC2 | CCS6 | 28.7 | 0.53 | 182 | 0.98 |
| MC2 | CCS7 | 4.4 | 0.82 | 182 | 0.98 |
| MC3 | ICS4 | 11.3 | 0.089 | 429 | 1 |
| MC3 | CCS8 | 13 | 0.091 | 483 | 1 |

*Based on feed composition

TABLE 2

Catalysts

| Catalyst | Al wt % | B wt % | Zr wt % | Al/Zr (mol/mol) | B/Zr (mol/mol) |
|---|---|---|---|---|---|
| ICS6 | 12.6 | 0.0168 | 0.086 | 498 | 1.7 |
| ICS7 | 12.0 | 0.0133 | 0.103 | 394 | 1.1 |
| ICS5 | 14.40 | 0.0115 | 0.061 | 796 | 1.6 |
| CCS9 | 13.70 | 0.0119 | 0.062 | 749 | 1.6 |
| CCS10 | 14.40 | 0.0101 | 0.064 | 763 | 1.3 |

Polymerizations Procedure for Propylene Homo Polymerization in Bulk

The polymerizations were performed in a 5 litre jacketed stainless-steel reactor equipped with a stirrer, lines for monomer and hydrogen, an exhaust line and feeding systems for catalyst and scavenger.

The catalyst feeder comprises two stainless steel cylinders in series. Inside a glovebox, desired amount of catalyst was loaded into the lower steel cylinder of the feeder and the second cylinder, containing 5 ml of dry pentane, was attached on top. The steel cylinder of the scavenger feeder was filled with 250 µl of triethylaluminum (purchased from Lanxess; trade name TEA-S) and 5 ml of dry pentane (purchased from Scharlau; reagent grade, ≥99%). Outside glovebox, the feed cylinders were attached to the reactor and the connections flushed with nitrogen. Reactor temperature was controlled to 20° C. The contents of the scavenger feeder was flushed into the reactor with nitrogen over pressure. Then, desired amount of hydrogen (25 or 15 mmol), followed by 1400 g of liquid propylene, was fed into the reactor. Stirring speed was set to 400 rpm. The reactor temperature was stabilised to 20° C. and after minimum of 5 minutes, the polymerization was started by injecting the catalyst into the reactor as described in the following. The valve between the two cylinders of the catalyst feeder was opened and the catalyst was then immediately flushed into the reactor with nitrogen over pressure. The feeder was pressurised three times with nitrogen and flushed into the reactor.

After 5 minutes prepolymerization at 20° C., the reactor temperature was raised to 70° C. over a period of 15 to 18 minutes. The polymerization was continued at 70° C. for 60 minutes and then stopped by flashing the reactor to normal pressure. Polymer was collected after flushing the reactor with nitrogen several times, left to dry overnight and then weighed to record the yield.

The catalyst activity was calculated based on the 60 minute period according to the following formula:

$$\text{Catalyst Activity (kg-}PP/\text{g-}Cat/\text{h)} = \frac{\text{amount of polymer produced (kg)}}{\text{catalyst loading (g)} \times \text{polymerization time (h)}}$$

The table above discloses catalyst systems ICS1, ICS2 and CCS1-CCS5 prepared from the identical MAO-silica support using same loading of metallocene MC1 and two catalysts prepared with metallocene MC3 (1E4, CE8). Comparative example CE5 shows a catalyst prepared without trityl tetrakis(pentafluorophenyl)borate, which has low metal activity. Inventive Example 1 and 2 using catalyst systems ICS 1 and ICS 2 were prepared using 1 equivalent of trityl tetrakis(pentafluorophenyl)borate added simultaneously with MC1 to give highest improvement in activity. Comparative catalyst system CCS 3 (CE3) is prepared according to the teachings of prior art documents such that borate was added in a second impregnation step, after the addition of MC1 to the activated support. Comparative catalyst CCS 3 (CE3) thus was prepared using inverted impregnation order, where borate addition followed metallocene addition on the support. As seen in the table, inventive addition order results in highest improvement of metal activity.

Comparative catalyst CCS 8 (CE8) was prepared using metallocene MC3 and inverted impregnation order, where borate addition followed metallocene addition on the support. Inventive Example 4 using catalyst ICS 4 with metallocene MC3 is prepared with trityl tetrakis(pentafluorophenyl)borate added simultaneously with MC3. As seen in the table, inventive addition order results in clearly higher metal activity compared to CE8.

Polymerizations Procedure for propylene Homo Polymerization in Bulk

The polymerization procedure was the same as described above, with the only difference that 15.0 mmol of hydrogen has been used.

TABLE 3

Polymerization experiments and results.

| Example | Cat system | H2 added mmol | Activity kg-PP/g-Cat/h | Metal Activity kg-PP/g-Zr/h | Catalyst amount Mg | Polymer Yield g | MFR$_2$ g/10min | Tm ° C. | Mw kg/mol | PDI |
|---|---|---|---|---|---|---|---|---|---|---|
| IE1 | ICS1 | 25 | 42.6 | 15105 | 6.7 | 285.4 | 10.1 | 154.6 | 238 | 3.2 |
| IE2 | ICS2 | 25 | 44.1 | 15198 | 6.7 | 295.3 | 9.5 | 153.9 | 244 | 3.0 |
| CE1 | CCS1 | 25 | 40.8 | 13633 | 8.9 | 362.8 | 7.72 | 154.8 | 241 | 3.1 |
| CE2 | CCS2 | 25 | 21.6 | 7005 | 14.8 | 319.3 | 8.5 | 153.7 | 248 | 2.9 |
| CE3 | CCS3 | 25 | 30.4 | 14318 | 15.0 | 455.3 | 7.9 | 153.6 | 256 | 2.9 |
| CE4 | CCS4 | 25 | 22.7 | 8883 | 14.6 | 330.7 | 11.6 | 151.6 | 234 | 3.0 |
| CE5 | CCS5 | 25 | 20.7 | 8355 | 15.4 | 319.1 | 16.3 | 149.6 | 196 | 3.0 |
| IE4 | ICS4 | 25 | 21.3 | 23858 | 15.9 | 338.0 | 27.9 | 155.0 | n.d. | n.d. |
| CE8 | CCS8 | 25 | 12.6 | 13719 | 15.5 | 195.0 | 36.2 | 153.2 | n.d. | n.d. |
| IE5 | ICS5 | 15 | 34 | 55174 | 9.2 | 310.5 | 9.8 | 154.4 | n.d. | n.d. |
| IE6 | ICS6 | 25 | 37 | 43435 | 10.0 | 371.8 | 42.6 | 153.2 | n.d. | n.d. |
| IE7 | ICS7 | 25 | 28 | 26736 | 10.4 | 286.4 | 48.4 | 153.2 | n.d. | n.d. |
| CE9 | CCS9 | 15 | 26 | 41680 | 9.1 | 234.4 | 11.3 | 153.5 | n.d. | n.d. |
| CE10 | CCS10 | 15 | 26 | 40254 | 8.5 | 218.3 | 14.2 | 152.7 | n.d. | n.d. |

Cat system: used catalyst system
n.d. not determined

TABLE 4

Polymerization experiments and results.

| Example | Cat | Activity kg-PP/g-Cat/h | Metal Activity kg-PP/g-Zr/h | Catalyst amount mg | Polymer yield G | MFR$_2$ g/10 min | Tm ° C. |
|---|---|---|---|---|---|---|---|
| IE3 | ICS3 | 28.6 | 30126 | 14.2 | 406.4 | 2.59 | 155.7 |
| CE6 | CC6 | 112.6 | 21122 | 3.8 | 427.8 | 2.80 | 156.9 |
| CE7 | CC7 | 13.6 | 16527 | 34.5 | 469.7 | 3.09 | 157.8 |

Cat: used catalyst system

From the above table it can be seen that the catalyst system prepared according to the invention has clearly higher metal activity compared to catalyst systems prepared by the emulsion/solidification process technology. In addition, the preparation method according to the present invention is much simpler.

The invention claimed is:

1. A process for the preparation of a supported catalyst system, wherein the catalyst system comprises:
   (i) a metallocene complex;
   (ii) a cocatalyst system comprising a boron containing cocatalyst and an aluminoxane cocatalyst; and
   (iii) a porous inorganic support;
   whereby the process comprises the steps of:
   a) reacting the porous inorganic support with a first portion of the aluminoxane cocatalyst in a first hydrocarbon solvent to obtain an aluminoxane cocatalyst treated support;
   b) reacting the metallocene complex with a second portion of the aluminoxane cocatalyst in a second hydrocarbon solvent,
   wherein the first portion of the aluminoxane cocatalyst added in step a) is from 75.0 to 97.0 wt % of the total amount of the aluminoxane cocatalyst and the second portion of the aluminoxane cocatalyst added in step b) is from 3.0 to 25.0 wt % of the total amount of aluminoxane cocatalyst;
   c) adding the boron containing cocatalyst to the solution obtained in step b) to obtain a solution of the metallocene complex, boron containing cocatalyst, and aluminoxane cocatalyst, wherein the metallocene complex includes a metal ion M and whereby the boron containing cocatalyst is added in an amount such that the molar ratio of boron/M is in the range of from 0.1:1 to 10:1;
   d) adding the solution obtained in step c) to the aluminoxane cocatalyst treated support obtained in step a) to form the supported catalyst system; and optionally
   e) drying the so obtained supported catalyst system.

2. The process as claimed in claim 1, wherein the metallocene complex is of formula (I)-(III):

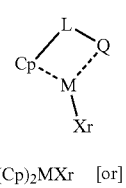

(I)

(Cp)$_2$MXr  [or]  (II)

(III)

wherein
each X independently is a sigma-donor ligand;
M is Ti, Zr, Hf, Y, Sc, La, or an element from the lanthanides;
each Cp independently is an unsubstituted or substituted cyclopentadienyl containing ligand or an unsubstituted or substituted fused cyclopentadienyl containing ligand;
Q is —O or —NW or —PW;
W is an organic group or H;
L is a carbon, silicon or germanium based bridge in which one to four backbone atoms link the ligands; and
r is an integer such that the oxidation state of the metal is satisfied.

3. The process as claimed in claim 1, wherein the metallocene complex is of formula (VI):

(VI)

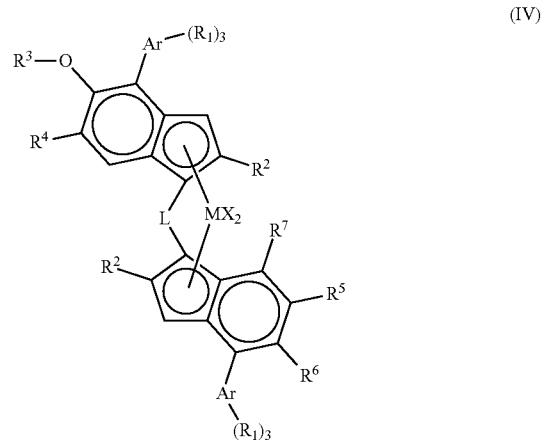

wherein
each X independently is a sigma-donor ligand;
M is a group 4 metal;
L is a carbon, silicon, or germanium based bridge in which one to four backbone atoms link the ligands; and
each Ind is a substituted or unsubstituted indenyl, or a substituted or unsubstituted fused indenyl.

4. The process as claimed in claim 1, wherein the metallocene complex is of formula (IV):

(IV)

wherein
each X independently is a sigma-donor ligand;
M is Zr or Hf,
L is a carbon, silicon, or germanium based divalent bridge in which one or two backbone atoms link the ligands;
each Ar is an aryl or heteroaryl group having 3 to 20 carbon atoms;
each R$^1$ independently is hydrogen, a linear or branched C$_1$-C$_6$-alkyl group, a C$_{7-20}$-arylalkyl group, a C$_{7-20}$-alkylaryl group, a C$_{6-20}$-aryl group, or an OY group, wherein Y is a C$_{1-10}$-hydrocarbyl group, or wherein two adjacent R$^1$ groups taken together with the phenyl carbons to which they are bonded form a ring;

each $R^2$ independently is a CHR$^{8'}$—R$^8$ group, with $R^8$ being H, a linear or branched $C_{1-6}$-alkyl group, a $C_{3-8}$-cycloalkyl group, a $C_{6-10}$-aryl group, or a heteroaryl group having 3 to 20 carbon atoms optionally substituted by one to three groups $R^{11}$, and $R^{8'}$ is H or a $C_{1-6}$ alkyl;

$R^3$ is a linear or branched $C_1$-$C_6$-alkyl group, a $C_{7-20}$-arylalkyl group, a $C_{7-20}$-alkylaryl group, or $C_6$-$C_{20}$-aryl group;

$R^4$ is a $C(R^9)_3$ group, with each $R^9$ independently being a linear or branched $C_1$-$C_6$-alkyl group;

$R^5$ and $R^6$ are each independently hydrogen or an aliphatic $C_1$-$C_{20}$-hydrocarbyl group optionally containing one or more heteroatoms from groups 14-16 of the periodic table of elements, or wherein $R^5$ and $R^6$ taken together form a 5 membered saturated carbon ring which is optionally substituted by n groups $R^{10}$, n being from 0 to 4, and each $R^{10}$ independently is a $C_1$-$C_{20}$-hydrocarbyl group, or a $C_1$-$C_{20}$-hydrocarbyl radical optionally containing one or more heteroatoms belonging to groups 14-16 of the periodic table of elements;

$R^7$ is H, a linear or branched $C_1$-$C_6$-alkyl group, or an aryl or heteroaryl group having 3 to 20 carbon atoms optionally substituted by one to three groups $R^{11}$; and each $R^{11}$ independently is hydrogen, a linear or branched $C_1$-$C_6$-alkyl group, a $C_{7-20}$-arylalkyl group, a $C_{7-20}$-alkylaryl group, a $C_{6-20}$-aryl group, or an OY group, wherein Y is a $C_{1-10}$-hydrocarbyl group.

5. The process as claimed in claim 1, wherein the metallocene complex is of formula (IX):

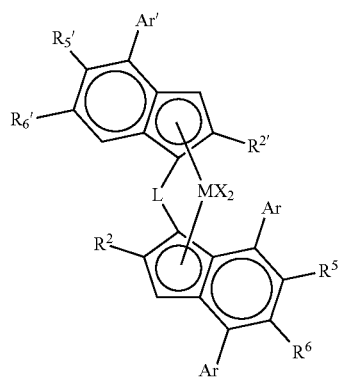

Formula (IX)

wherein
each X independently is a sigma-donor ligand;
M is a group 4 metal;
L is a carbon, silicon, or germanium based divalent bridge in which one or two backbone atoms link the ligands;
$R^2$ and $R^{2'}$ are, independently from each other, H, —OSi$(C_{1-10}$-hydrocarbyl$)_3$, or CHR$^{8'}$—R$^8$ group;
$R^8$ being H, a linear or branched $C_{1-6}$-alkyl group, a $C_{3-8}$-cycloalkyl group, a $C_{6-10}$-aryl group, or an optionally substituted heteroaryl group having 3 to 20 carbon atoms;
$R^{8'}$ is H or a $C_{1-6}$ alkyl;
$R^5$-$R^6$ are each independently hydrogen or a $C_1$-$C_{20}$-hydrocarbyl group optionally containing one or more heteroatoms from groups 14-16 of the periodic table of elements, or $R^5$ and $R^6$ taken together form a 5 membered saturated carbon ring which is optionally substituted by n groups $R^{10}$, n being from 0 to 4;

$R^{5'}$—$R^{6'}$ are each independently hydrogen or a $C_1$-$C_{20}$-hydrocarbyl group optionally containing one or more heteroatoms from groups 14-16 of the periodic table of elements, or $R^{5'}$ and $R^{6'}$ taken together form a 5 membered saturated carbon ring which is optionally substituted by n groups $R^{10}$, n being from 0 to 4;

each $R^{10}$ is independently a $C_1$-$C_{20}$-hydrocarbyl group, or a $C_1$-$C_{20}$-hydrocarbyl radical optionally containing one or more heteroatoms belonging to groups 14-16 of the periodic table of elements;

Ar and Ar' are independently phenyl, naphthyl, anthracenyl, pyridyl, thiophenyl, 2-alkylthiophenyl, benzothiophenyl, pyrrolyl, furanyl, or 2-alkylfuranyl optionally substituted by up to 5 groups $R^1$; and each $R^1$ independently is hydrogen, a linear or branched $C_1$-$C_6$-alkyl group, a $C_{7-20}$-arylalkyl group, a $C_{7-20}$-alkylaryl group, $C_{6-20}$-aryl group, or an OY group, wherein Y is a $C_{1-10}$-hydrocarbyl group.

6. The process as claimed in claim 1 wherein the porous inorganic support is a silica support and the metallocene complex is of formula (V):

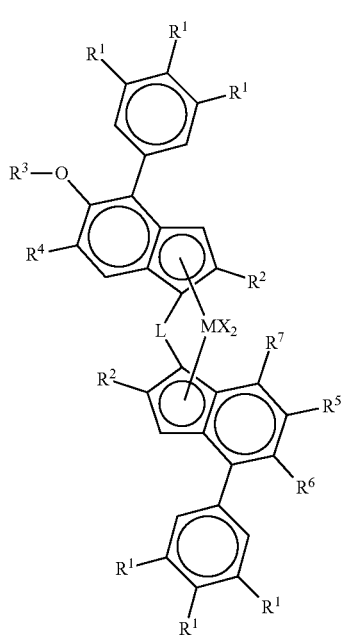

Formula (V)

wherein
M is Zr or Hf;
each X independently is a sigma-donor ligand;
L is a divalent bridge selected from —R'$_2$C—, —R'$_2$C—CR'$_2$-, —R'$_2$Si—, —R'$_2$Si—SiR'$_2$—, and —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or wherein two R' groups taken together form a ring;

each $R^1$ independently is hydrogen, a linear or branched $C_1$-$C_6$-alkyl group, a $C_{7-20}$-arylalkyl group, a $C_{7-20}$-alkylaryl group, a $C_{6-20}$-aryl group, or an OY group, wherein Y is a $C_{1-10}$-hydrocarbyl group, or wherein two adjacent $R^1$ groups taken together with the phenyl carbons to which they are bonded form a ring;

each $R^2$ independently is a CH$_2$—R$^8$ group, with $R^8$ being H or linear or branched $C_{1-6}$-alkyl group, a $C_{3-8}$-cycloalkyl group, or a $C_{6-10}$-aryl group;

R³ is a linear or branched $C_1$-$C_6$-alkyl group, a $C_{7-20}$-arylalkyl group, a $C_{7-20}$-alkylaryl group, or $C_6$-$C_{20}$-aryl group;

R⁴ is a $C(R^9)_3$ group, with R⁹ being a linear or branched $C_1$-$C_6$-alkyl group;

R⁵ and R⁶ are each independently hydrogen or an aliphatic $C_1$-$C_{20}$-hydrocarbyl group optionally containing one or more heteroatoms from groups 14-16 of the periodic table of elements, or wherein R⁵ and R⁶ are joined as part of a 5-membered ring condensed with the indenyl, which is optionally substituted by n groups $R^{10}$, n being from 0 to 4;

each $R^{10}$ is independently a $C_1$-$C_{20}$-hydrocarbyl group, or a $C_1$-$C_{20}$-hydrocarbyl radical optionally containing one or more heteroatoms belonging to groups 14-16 of the periodic table of elements;

R⁷ is H, a linear or branched $C_1$-$C_6$-alkyl group, or an aryl or heteroaryl group having 6 to 20 carbon atoms optionally substituted by one to three groups $R^{11}$; and each $R^{11}$ independently is hydrogen, a linear or branched $C_1$-$C_6$-alkyl group, a $C_{7-20}$-arylalkyl group, a $C_{7-20}$-alkylaryl group, a $C_{6-20}$-aryl group, or an OY group, wherein Y is a $C_{1-10}$-hydrocarbyl group.

7. The process according to claim 6, wherein in the formula (V) of the metallocene complex (i):

each X independently is a hydrogen atom, a halogen atom, a linear, branched, or cyclic $C_{1-20}$-alkyl or -alkoxy group, a $C_{6-20}$-aryl group, a $C_{7-20}$-alkylaryl group, or a $C_{7-20}$-arylalkyl group;

L is —R'₂Si—, ethylene, or methylene, whereby each R' is independently a $C_1$-$C_{20}$-hydrocarbyl group;

each R¹ independently is hydrogen, or a linear or branched $C_1$-$C_6$-alkyl group;

both R² are the same and are a CH₂—R⁸ group, with R⁸ being H or a linear or branched $C_1$-$C_4$-alkyl group;

R³ is a linear or branched $C_1$-$C_6$-alkyl group or $C_{6-20}$-aryl group;

R⁴ is a $C(R^9)_3$ group, with each R⁹ independently being a linear or branched $C_1$-$C_4$-alkyl group;

R⁵ and R⁶ are independently hydrogen or an aliphatic $C_1$-$C_{20}$-hydrocarbyl group optionally containing one or more heteroatoms from groups 14-16 of the periodic table of elements, or R⁵ and R⁶ are joined as part of a 5-membered ring condensed with the indenyl, which is optionally substituted by n groups $R^{10}$, n being from 0 to 4, whereby each $R^{10}$ independently is a $C_1$-$C_{20}$-hydrocarbyl group, or a $C_1$-$C_{20}$-hydrocarbyl radical optionally containing one or more heteroatoms belonging to groups 14-16 of the periodic table of elements;

R⁷ is H or an aryl group having 6 to 10 carbon atoms optionally substituted by 1 to 3 groups $R^{11}$; and each $R^{11}$ independently being hydrogen, a linear or branched $C_1$-$C_6$-alkyl group, a $C_{6-20}$-aryl group, or an OY -group, wherein Y is a is a $C_{1-4}$-hydrocarbyl group.

8. The process according to claim 1, wherein the metallocene complex (i) is:

rac-dimethylsilanediyl-bis-[2-methyl-4-(3'5'dimethylphenyl)-5-methoxy-6-tert-butylinden-1-yl] zirconium dichloride, rac-anti-dimethylsilanediyl [2-methyl-4-(4'-tert.-butylphenyl)-inden-1-yl] [2-methyl-4-(4'-tert.-butylphenyl)-5-methoxy-6-tert-butylinden-1-yl] zirconium dichloride, rac-anti-dimethylsilanediyl [2-methyl-4-(4'-tert.-butylphenyl)-inden-1-yl] [2-methyl-4-phenyl-5-methoxy-6-tert-butylinden-1-yl] zirconium dichloride, rac-anti-dimethylsilanediyl [2-methyl-4-(3',5'-tert-butylphenyl)-1,5,6,7-tetrahydro-s-indacen-1-yl] [2-methyl-4-(3',5'-dimethyl-phenyl)-5-methoxy-6-tert-butylinden-1-yl] zirconium dichloride, rac-anti-dimethylsilanediyl [2-methyl-4,8-bis-(4'-tert-butylphenyl)-1,5,6,7-tetrahydro-s-indacen-1-yl] [2-methyl-4-(3',5'-dimethyl-phenyl)-5-methoxy-6-tert-butylinden-1-yl] zirconium dichloride, rac-anti-dimethylsilanediyl [2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert-butylinden-1-yl] zirconium dichloride, rac-anti-dimethylsilanediyl [2-methyl-4,8-bis-(3',5'-dimethylphenyl)-1,5,6,7-tetrahydro-s-indacen-1-yl] [2-methyl-4-(3',5'-ditert-butyl-phenyl)-5-methoxy-6-tert-butylinden-1-yl] zirconium dichloride, or their hafnium analogues.

9. The process according to claim 1, wherein the aluminoxane cocatalyst is of formula (A);

wherein n is from 6 to 20; and

R is $C_1$-$C_{10}$-alkyl.

10. The process according to claim 1, wherein the boron containing cocatalyst is either one of formula (B) or a borate containing an anion of formula (C):

wherein each Y independently is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine; or Z is an optionally substituted phenyl derivative, said substituent being a halo-$C_{1-6}$-alkyl or halo group, and as counterions protonated amine or aniline derivatives.

11. The process according to claim 10, wherein the boron containing cocatalyst is:

triphenylcarbeniumtetrakis(pentafluorophenyl) borate,

N,N— dimethylaniliniumtetrakis(pentafluorophenyl) borate,

N,N— dimethylcyclohexylammoniumtetrakis(pentafluorophenyl)borate, or

N,N— dimethylbenzylammoniumtetrakis(pentafluorophenyl)borate.

12. The process according to claim 1, wherein the metallocene complex includes a metal ion M and the metallocene complex, the boron containing cocatalyst, and the aluminoxane cocatalyst are each provided in an amount such that the molar ratio of boron to the metal ion M in the metallocene complex is in the range of 0.1:1 to 10:1 mol/mol, and/or the molar ratio of aluminum in the aluminoxane cocatalyst to the metal ion M in the metallocene complex is in the range of 1:1 to 2000:1 mol/mol.

13. The process according to claim 1, wherein the porous inorganic support has an average particle size of from 10 to 100 μm.

14. The process according to claim 1, wherein the porous inorganic support has an average pore size of from 10 to 100 nm and a pore volume of from 1 to 3 mL/g.

15. The process according to claim 1, wherein the catalyst system comprises from 5 to 500 μmol of zirconium or hafnium per gram of the porous inorganic support and from 5 to 10 mmol of Al per gram of the porous inorganic support.

16. The process according to claim 1, wherein in step a):
first the porous inorganic support is suspended in the first hydrocarbon solvent to form a suspension;
then the first portion of the aluminoxane cocatalyst is added to the suspension in an amount such that there is from 3-12 mmol Al per gram of the porous inorganic support, thereby forming a support/solvent/aluminoxane mixture;
subsequently heating the support/solvent/aluminoxane mixture to a temperature in the range of from 80° C. to 120° C.;
whereby toluene is used as the first hydrocarbon solvent.

17. The process according to claim 1,
wherein in step a) the aluminoxane cocatalyst treated support is washed one or more times, with toluene and optionally one more times with heptane at an elevated temperature of from 70° C. to 115° C., with a subsequent drying step.

18. The process according to claim 1, wherein in step a) 77.0 to 95.0 wt % of the total amount of aluminoxane cocatalyst is added and 5.0 to 23.0 wt % of the total amount of aluminoxane cocatalyst is added in step b).

19. The catalyst system obtained according to the process of claim 1.

20. A process for the preparation of a polyethylene homopolymer or polyethylene copolymer with one or more C3 to C8 alpha olefin comonomers, said process comprising polymerising ethylene and optionally one or more C3 to C8 alpha olefin comonomers in the presence of the catalyst system of claim 19.

21. A process for the preparation of a polypropylene homopolymer or polypropylene copolymer with one or more C2 to C8 alpha olefin comonomers, said process comprising polymerising propylene and optionally one or more C2 to C8 alpha olefin comonomers in the presence of the catalyst system of claim 19.

* * * * *